(12) United States Patent
Hattori et al.

(10) Patent No.: US 10,767,541 B2
(45) Date of Patent: Sep. 8, 2020

(54) ATTACHMENT STRUCTURE OF PARTICULATE SENSOR, PARTICULATE SENSOR, SENSOR ATTACHMENT PORTION, AND SENSOR ATTACHMENT PORTION EQUIPPED GAS FLOW PIPE

(71) Applicant: NGK SPARK PLUG CO., LTD., Nagoya-shi, Aichi (JP)

(72) Inventors: Hiroki Hattori, Nagoya (JP); Ryosuke Noda, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 16/357,441

(22) Filed: Mar. 19, 2019

(65) Prior Publication Data
US 2019/0292967 A1    Sep. 26, 2019

(30) Foreign Application Priority Data

Mar. 22, 2018    (JP) .................................. 2018-054257

(51) Int. Cl.
| | | |
|---|---|---|
| *F01N 11/00* | (2006.01) | |
| *G01N 15/06* | (2006.01) | |
| *F01N 13/00* | (2010.01) | |
| *G01N 15/00* | (2006.01) | |

(52) U.S. Cl.
CPC ............ *F01N 11/00* (2013.01); *F01N 13/008* (2013.01); *G01N 15/0656* (2013.01); *F01N 2560/05* (2013.01); *G01N 2015/0046* (2013.01)

(58) Field of Classification Search
CPC .... F01N 11/00; F01N 13/008; F01N 2560/05; G01N 15/0656; G01N 2015/0046
See application file for complete search history.

(56) References Cited

U.S. PATENT DOCUMENTS

| | | | |
|---|---|---|---|
| 2008/0016946 A1* | 1/2008 | Thanigachalam | ........................... G01N 27/4077 73/31.05 |
| 2012/0234172 A1 | 9/2012 | Sugiyama et al. | |
| 2014/0352405 A1* | 12/2014 | Motomura | .............. F01N 11/00 73/23.31 |
| 2018/0088082 A1* | 3/2018 | Inoue | ....................... F01N 11/00 |
| 2018/0291792 A1* | 10/2018 | Zhang | .................... G01N 27/04 |

FOREIGN PATENT DOCUMENTS

| | | | |
|---|---|---|---|
| JP | 2012-194078 A | | 10/2012 |
| JP | 2017-166963 A | | 9/2017 |
| JP | 2017166963 A | * | 9/2017 |
| JP | 2017187444 A | * | 10/2017 |
| JP | 2018112413 A | * | 7/2018 |

* cited by examiner

*Primary Examiner* — Francis C Gray
(74) *Attorney, Agent, or Firm* — Sughrue Mion, PLLC

(57) ABSTRACT

A particulate sensor (1) having a sensor-side positioning portion (11*k*) for determining the circumferential position of a sensor main body (5) with respect to a sensor attachment portion (120) when the particulate sensor (1) is attached to the sensor attachment portion (120). The sensor attachment portion (120) has a pipe-side positioning portion (121) which conforms to the sensor-side positioning portion (11*k*) and is configured such that, when the particulate sensor (1) is attached to the sensor attachment portion (120), the circumferential position of the sensor main body (5) with respect to the sensor attachment portion (120) is always set to a fixed circumferential position.

6 Claims, 22 Drawing Sheets

ATTACHMENT STRUCTURE OF PARTICULATE SENSOR, PARTICULATE SENSOR, SENSOR ATTACHMENT PORTION, AND SENSOR ATTACHMENT PORTION EQUIPPED GAS FLOW PIPE

BACKGROUND OF THE INVENTION

1. Field of the Invention

The present invention relates to an attachment structure of a particulate sensor which detects the amount of particulates in a gas under measurement flowing through a gas flow pipe. The present invention also relates to the particulate sensor, to a sensor attachment portion, and to a sensor attachment portion equipped gas flow pipe.

2. Description of the Related Art

In some applications, there is a need to measure the amount of particulates in a gas. For example, exhaust gas from an internal combustion engine (e.g., a diesel engine or a gasoline engine) may contain particulates such as soot. Exhaust gas containing such particulates is cleaned by collecting the particulates with a filter. Therefore, when a malfunction such as breakage of the filter occurs, uncleaned exhaust gas is discharged directly to the downstream of the filter. Therefore, there has been a demand for a particulate sensor which can detect the amount of particulates in the exhaust gas on the downstream side of the filter, thereby enabling direct measurement of the amount of particulates in the exhaust gas or detection of a malfunction of the filter.

Such a particulate sensor is disclosed in Patent Document 1. The disclosed particulate sensor has a sensor main body extending in the axial direction. The particulate sensor is detachably attached to a sensor attachment portion fixed to a gas flow pipe (exhaust pipe) maintained at a ground potential in such manner that a portion of the sensor main body on the forward end side in the axial direction is disposed inside the gas flow pipe. The particulate sensor detects the amount of particulates contained in a gas under measurement (exhaust gas) flowing through the gas flow pipe.

[Patent Document 1] Japanese Patent Application Laid-Open (kokai) No. 2017-166963

In the case of the particulate sensor of Patent Document 1, a pipe interior disposition portion (a portion disposed inside the exhaust pipe) of the sensor main body has a single gas introduction opening which penetrates the wall of the pipe interior disposition portion and which introduces the gas under measurement into a space inside the sensor main body. The gas introduction opening is formed in the pipe interior disposition portion such that, when the outer circumferential surface of the pipe interior disposition portion is viewed in the circumferential direction, a circumferential range of the pipe interior disposition portion in which the entire gas introduction opening is contained is equal to or less than half of the entire circumference of the pipe interior disposition portion. In other words, the gas introduction opening is formed in the pipe interior disposition portion such that, when the pipe interior disposition portion is cut, along the axis of the pipe interior disposition portion, into two portions; i.e., a portion on one side of the pipe interior disposition portion and a portion on the other side of the pipe interior disposition portion, the entire gas introduction opening is located in the portion on the one side.

3. Problems to be Solved by the Invention

The above particulate sensor has the following problem. If a change arises in the circumferential position (position around the axis of the sensor main body) of the sensor main body with respect to the sensor attachment portion at the time of attachment of the particulate sensor to the sensor attachment portion, naturally, the circumferential position(s) (position(s) in the circumferential direction of the sensor main body or the pipe interior disposition portion) of one or more gas introduction openings in the gas flow pipe changes. Therefore, when the particulate sensor is detached from the sensor attachment portion for some reason or the other and is again attached to the sensor attachment portion, the circumferential position of the gas introduction opening in the gas flow pipe may change from the original position. In such a case, even when the flow velocity of the gas under measurement flowing through the gas flow pipe does not change, the flow velocity of the gas under measurement introduced into the space inside the sensor main body (the amount of the gas introduced per unit time) changes from that when the particulate sensor was attached to the sensor attachment portion before the detachment. As a result, the particulate sensor may fail to accurately detect the amount of particulates.

Therefore, there has been a demand for an attachment structure which can always set the circumferential position(s) (position(s) in the circumferential direction of the sensor main body or the pipe interior disposition portion) of one or more gas introduction openings in the gas flow pipe to a fixed circumferential position(s) when the particulate sensor is again attached to the sensor attachment portion after having been detached from the sensor attachment portion for some reason or the other. For example, there has been a demand for an attachment structure which can always set the circumferential position(s) of the one or more gas introduction openings in the gas flow pipe to the fixed circumferential position(s) when the particulate sensor is periodically detached from the sensor attachment portion for periodic cleaning of the particulate sensor and is then reattached to the sensor attachment portion after the cleaning.

SUMMARY OF THE INVENTION

The present invention has been accomplished in view of the above-mentioned circumstances, and an object therefor is to provide a particulate sensor attachment structure, a particulate sensor, a sensor attachment portion, and a sensor attachment portion equipped gas flow pipe which can always set the circumferential position(s) of one or more gas introduction openings in a gas flow pipe to a fixed circumferential position(s) when the particulate sensor is reattached to the sensor attachment portion after having been detached from the sensor attachment portion.

The above object has been achieved in a first aspect (1) of the invention by providing an attachment structure of a particulate sensor (hereinafter also referred to as a "particulate sensor attachment structure") for attaching the particulate sensor to a sensor attachment portion fixed to a gas flow pipe, the particulate sensor detecting the amount of particulates contained in a gas under measurement flowing through the gas flow pipe, wherein the particulate sensor includes a tubular sensor main body extending in an axial direction and which can be attached to and detached from the sensor attachment portion, wherein the sensor main body has a pipe interior disposition portion which is a portion of the sensor main body located on a forward end side in the axial direction and has the shape of a tube extending in the axial direction and which is disposed in the gas flow pipe when the particulate sensor is attached to the sensor attachment portion, wherein the pipe interior disposition portion has one or more gas introduction openings which penetrate a wall portion of the pipe interior disposition portion and through which the gas under measurement is introduced into the sensor main body, wherein the one or more gas introduction openings are formed in the pipe interior disposition portion such that, when an outer circumferential surface of the pipe interior disposition portion is viewed in a circumferential direction, a circumferential region of the pipe interior disposition portion which includes all the one or more gas introduction openings extends halfway or less in the circumferential direction of the pipe interior disposition portion, wherein the particulate sensor has a sensor-side positioning portion which determines the circumferential position of the sensor main body with respect to the sensor attachment portion when the particulate sensor is attached to the sensor attachment portion, and wherein the sensor attachment portion has a pipe-side positioning portion which conforms to the sensor-side positioning portion and is configured such that, when the particulate sensor is attached to the sensor attachment portion with the sensor-side positioning portion and the pipe-side positioning portion being mated with each other, the circumferential position of the sensor main body with respect to the sensor attachment portion is always set to a fixed circumferential position, whereby, when the particulate sensor is attached to the sensor attachment portion with the sensor-side positioning portion and the pipe-side positioning portion being mated with each other, the circumferential position of each of the one or more gas introduction openings within the gas flow pipe is always set to a fixed first circumferential position.

In the above-described attachment structure (1), the particulate sensor includes a tubular sensor main body extending in the axial direction which can be attached to and detached from the sensor attachment portion fixed to the gas flow pipe. The sensor main body has a pipe interior disposition portion which is a portion of the sensor main body located on a forward end side in the axial direction and has the shape of a tube extending in the axial direction and which is disposed in the gas flow pipe when the particulate sensor is attached to the sensor attachment portion. The pipe interior disposition portion has one or more gas introduction openings which penetrate a wall portion of the pipe interior disposition portion and through which the gas under measurement is introduced into the sensor main body.

The one or more gas introduction openings are formed in the pipe interior disposition portion such that, when an outer circumferential surface of the pipe interior disposition portion is viewed in a circumferential direction, a circumferential region of the pipe interior disposition portion which includes all of the one or more gas introduction openings (the smallest circumferential region which includes all of the one or more gas introduction openings) extends halfway or less in the circumferential direction of the pipe interior disposition portion. In other words, the one or more gas introduction openings are formed in the pipe interior disposition portion such that, when the pipe interior disposition portion is cut, along the axis of the pipe interior disposition portion, into two portions; i.e., a portion on one side of the pipe interior disposition portion and a portion on the other side of the pipe interior disposition portion, all of the one or more gas introduction openings are located in the portion on the one side.

If a change arises in the circumferential position of the sensor main body (position around the axis of the sensor main body) with respect to the sensor attachment portion at the time of attachment of the particulate sensor to the sensor attachment portion, the circumferential position (position in the circumferential direction of the sensor main body or the pipe interior disposition portion) of each of the one or more gas introduction openings within the gas flow pipe changes. As a result, the particulate sensor may fail to accurately detect the amount of particulates contained in the gas under measurement. Therefore, there is demand for an attachment structure which can always set the circumferential position of each of the one or more gas introduction openings within the gas flow pipe to a fixed circumferential position when the particulate sensor is reattached to the sensor attachment portion after having been detached from the sensor attachment portion.

In view of the above, in the above-described attachment structure (1), the particulate sensor has a sensor-side positioning portion which determines the circumferential position (position about the axis of the sensor main body) of the sensor main body with respect to the sensor attachment portion when the particulate sensor is attached to the sensor attachment portion.

Further, the sensor attachment portion has a pipe-side positioning portion which conforms to (corresponds to, can be mated with) the sensor-side positioning portion and is configured such that, when the particulate sensor is attached to the sensor attachment portion with the sensor-side positioning portion and the pipe-side positioning portion being mated with each other, the circumferential position of the sensor main body with respect to the sensor attachment portion is always set to a fixed circumferential position.

Thus, when the particulate sensor is attached to the sensor attachment portion with the sensor-side positioning portion and the pipe-side positioning portion being mated with each other, the circumferential position (position in the circumferential direction of the sensor main body or the pipe interior disposition portion) of each of the one or more gas introduction openings within the gas flow pipe is always set to a fixed first circumferential position.

Accordingly, the above-described particulate sensor attachment structure (1) can always set the circumferential position of each of the one or more gas introduction openings within the gas flow pipe to the fixed circumferential position when the particulate sensor is detached from the sensor attachment portion and is reattached to the sensor attachment portion. Therefore, in the case where the particulate sensor is regularly detached from the sensor attachment portion for the purpose of, for example, regular cleaning of the particulate sensor, when the particulate sensor is reattached to the sensor attachment portion after the cleaning, the circumferential position of each of the one or more gas introduction openings within the gas flow pipe can always be set to the fixed circumferential position.

Accordingly, the above-described particulate sensor attachment structure (1) can prevent the occurrence of a malfunction of failure to accurately detect the amount of particulates, which malfunction would otherwise occur in the case where, when the particulate sensor is detached from the sensor attachment portion and is reattached to the sensor attachment portion, the circumferential position of each of the one or more gas introduction openings within the gas flow pipe changes from the original position before the particulate sensor is detached.

In a preferred embodiment (2) of the above-described particulate sensor attachment structure (1), the gas flow pipe has a hole-defining portion which defines a through hole penetrating a wall portion of the gas flow pipe and to which the sensor attachment portion is attached, wherein the sensor attachment portion has a surrounding portion which has the shape of a tube extending in the axial direction and is disposed in the gas flow pipe, the surrounding portion surrounding a circumference of the pipe interior disposition portion of the sensor main body in a state in which the particulate sensor is attached to the sensor attachment portion fixed to the gas flow pipe, and wherein, in the state in which the particulate sensor is attached to the sensor attachment portion fixed to the gas flow pipe, a surrounding forward end portion which is a part of the surrounding portion located furthest to the forward end side in the axial direction is located on the forward end side, in the axial direction, of the gas introduction opening of the pipe interior disposition portion.

Incidentally, water may accumulate inside the gas flow pipe. For example, in the case where the gas flow pipe is an exhaust pipe, since the exhaust pipe is cooled after operation of an internal combustion engine, condensed water accumulates inside the exhaust pipe in some cases. Therefore, conventionally, there has been a possibility that, in a state in which the particulate sensor is attached to the sensor attachment portion fixed to the gas flow pipe, the water remaining in the gas flow pipe may spray from the upstream side of the gas flow pipe toward the pipe interior disposition portion of the particulate sensor due to flow of the gas under measurement within the gas flow pipe from the upstream side toward the downstream side. In such a case, water may enter the interior of the particulate sensor (the sensor main body) through the gas introduction opening(s). As a result, the particulate sensor may become unable to accurately detect the amount of particulates.

In contrast, in the above-described attachment structure (2), the sensor attachment portion has a surrounding portion which has the shape of a tube extending in the axial direction and is disposed in the gas flow pipe in a state in which the sensor attachment portion is fixed to the gas flow pipe. The surrounding portion surrounds a circumference of the pipe interior disposition portion of the sensor main body in a state in which the particulate sensor is attached to the sensor attachment portion fixed to the gas flow pipe (surrounds the circumference of the pipe interior disposition portion while being spaced from the pipe interior disposition portion).

Further, in a state in which the particulate sensor is attached to the sensor attachment portion fixed to the gas flow pipe, the surrounding forward end portion, which is a part of the surrounding portion located furthest to the forward end side in the axial direction, is located on the forward end side, in the axial direction, of the gas introduction opening(s) of the pipe interior disposition portion. Namely, in the state in which the particulate sensor is attached to the sensor attachment portion fixed to the gas flow pipe, the surrounding portion extends in the axial direction from the position of the hole-defining portion of the gas flow pipe to a position on the pipe interior disposition portion of the sensor main body, which position is located on the forward end side of the position of the gas introduction opening(s).

In the above-described attachment structure (2), since such a surrounding portion is provided, in the state in which the particulate sensor is attached to the sensor attachment portion fixed to the gas flow pipe, water is less likely to enter the interior of the particulate sensor (the sensor main body) through the gas introduction opening(s). This result is obtained even in the case where water remaining in the gas flow pipe sprays from the upstream side of the gas flow pipe toward the pipe interior disposition portion of the particulate sensor due to flow of the gas under measurement within the gas flow pipe from the upstream side toward the downstream side. Namely, since the water spraying from the upstream side of the gas flow pipe toward the pipe interior disposition portion of the particulate sensor is received by the surrounding portion, water is less likely to enter the interior of the particulate sensor (the sensor main body) through the gas introduction opening(s).

In another preferred embodiment (3) of the above-described particulate sensor attachment structure (2), the one or more gas introduction openings positioned at the first circumferential position as a result of attachment of the particulate sensor to the sensor attachment portion are open toward a downstream side of the gas flow pipe, and the surrounding portion has a gas introduction window which is open toward the downstream side of the gas flow pipe and through which the one or more gas introduction openings can be visually recognized from the outside of the surrounding portion in a state in which the particulate sensor is attached to the sensor attachment portion fixed to the gas flow pipe.

In the above-described attachment structure (3), each of the one or more gas introduction openings positioned at the first circumferential position as a result of attachment of the particulate sensor to the sensor attachment portion fixed to the gas flow pipe is open toward the downstream side of the gas flow pipe.

Further, the surrounding portion of the sensor attachment portion has a gas introduction window which is open toward the downstream side of the gas flow pipe in a state in which the sensor attachment portion is fixed to the gas flow pipe. The gas introduction window is configured such that, in the state in which the particulate sensor is attached to the sensor attachment portion fixed to the gas flow pipe, the one or more gas introduction openings can be visually recognized from the outside of the surrounding portion through the gas introduction window.

By virtue of the above-described configuration, water spraying from the upstream side of the gas flow pipe toward the pipe interior disposition portion of the particulate sensor is received by a part of the surrounding portion located on the upstream side of the gas flow pipe, so that the water is less likely to enter the interior of the particulate sensor (the sensor main body) through the gas introduction opening(s). In addition, it becomes easier for the gas under measurement flowing through the gas flow pipe to be introduced into the one or more gas introduction openings through the gas introduction window.

In yet another preferred embodiment (4) of any of the above-described particulate sensor attachment structures (1) to (3) above, the sensor attachment portion having the surrounding portion is at ground potential as a result of the sensor attachment portion being fixed to the gas flow pipe maintained at ground potential, and the pipe interior disposition portion of the sensor main body is electrically insulated from the sensor attachment portion and maintained at a reference potential different from the ground potential.

In the above-described attachment structure (4), the sensor attachment portion having the surrounding portion is at ground potential as a result of fixing the sensor attachment portion to the gas flow pipe maintained at ground potential.

Meanwhile, the pipe interior disposition portion which is a portion of the sensor main body and which has the gas introduction opening(s) is electrically insulated from the sensor attachment portion and maintained at a reference potential different from ground potential.

Incidentally, particulates (soot, etc.) contained in the gas under measurement may adhere to the outer circumferential surface of the pipe interior disposition portion which is a portion of the sensor main body and has the gas introduction opening(s). As a result, the electrical insulation between the pipe interior disposition portion maintained at the reference potential and the surrounding portion which is a portion of the sensor attachment portion maintained at the ground potential and surrounds the circumference of the pipe interior disposition portion may deteriorate. In such a case, the particulate sensor may fail to accurately detect the amount of particulates.

For the above-described reason, regular cleaning of the particulate sensor (the pipe interior disposition portion) is preferred. Therefore, there is demand for an attachment structure which ensures that, in the case where the particulate sensor is regularly detached from the sensor attachment portion so as to clean the particulate sensor, when the particulate sensor is reattached to the sensor attachment portion after cleaning, as described above, the circumferential position of each of the one or more gas introduction openings within the gas flow pipe can be set to the fixed circumferential position.

In view of the above, the above-described particulate sensor attachment structure ensures that, when the particulate sensor is attached to the sensor attachment portion such that the sensor-side positioning portion and the pipe-side positioning portion are mated with each other, the circumferential position (position in the circumferential direction of the sensor main body or the pipe interior disposition portion) of the one or more gas introduction openings within the gas flow pipe is always set to the fixed first circumferential position.

Accordingly, in a case where the particulate sensor is regularly detached from the sensor attachment portion for regular cleaning of the particulate sensor, the above-described particulate sensor attachment structure ensures that, when the particulate sensor is reattached to the sensor attachment portion after cleaning, the circumferential position of each of the one or more gas introduction openings within the gas flow pipe can always be set to the fixed circumferential position.

In any of the above-described particulate sensor attachment structures, preferably, the sensor attachment portion is at ground potential as a result of being fixed to the gas flow pipe maintained at ground potential. Further, the sensor main body includes an inner metallic member which contains the pipe interior disposition portion and is maintained at a reference potential different from ground potential. A tubular outer metallic member which surrounds a circumference of the inner metallic member and is at ground potential as a result of coming into contact with the sensor attachment portion in a state in which the particulate sensor is attached to the sensor attachment portion. Also, an insulating spacer which is interposed between the inner metallic member and the outer metallic member so as to electrically insulate the inner metallic member and the outer metallic member from each other and which is disposed at a position where the gas under measurement flowing through the gas flow pipe can come into contact with the insulating spacer in a state in which the particulate sensor is attached to the sensor attachment portion.

In the above-described attachment structure, the sensor main body has an insulating spacer which is interposed between the inner metallic member maintained at a reference potential and the outer metallic member maintained at ground potential so as to electrically insulate the inner metallic member and the outer metallic member from each other. The insulating spacer is disposed at a position where the gas under measurement flowing through the gas flow pipe can come into contact with the insulating spacer in a state in which the particulate sensor is attached to the sensor attachment portion.

Therefore, particulates (soot, etc.) contained in the gas under measurement may adhere to the surface of the insulating spacer. As a result, the insulating resistance of the surface of the insulating spacer decreases, and the electrical insulation between the inner metallic member maintained at the reference potential and the outer metallic member maintained at ground potential deteriorates (for example, a micro short circuit is formed through the particulates such as soot adhered to the surface of the insulating spacer). In such a case, the particulate sensor may fail to accurately detect the amount of particulates.

For the above-described reason, regular cleaning of the particulate sensor is preferred. Therefore, there is demand for an attachment structure which ensures that, in the case where the particulate sensor is regularly detached from the sensor attachment portion so as to clean the particulate sensor, when the particulate sensor is reattached to the sensor attachment portion after cleaning, as described above, the circumferential position of each of the one or more gas introduction openings within the gas flow pipe can be set to the fixed circumferential position.

In view of the above, the above-described particulate sensor attachment structure ensures that, when the particulate sensor is attached to the sensor attachment portion such that the sensor-side positioning portion and the pipe-side positioning portion are mated with each other, the circumferential position (position in the circumferential direction of the sensor main body or the pipe interior disposition portion) of the one or more gas introduction openings within the gas flow pipe is always set to the fixed first circumferential position.

Accordingly, in a case where the particulate sensor is regularly detached from the sensor attachment portion for regular cleaning of the particulate sensor, the above-described particulate sensor attachment structure ensures that, when the particulate sensor is reattached to the sensor attachment portion after cleaning, the circumferential position of each of the one or more gas introduction openings within the gas flow pipe can always be set to the fixed circumferential position.

In a second aspect (5), the present invention provides a particulate sensor which is attached to a sensor attachment portion fixed to a gas flow pipe and adapted to detect the amount of particulates contained in a gas under measurement flowing through the gas flow pipe, wherein the particulate sensor includes a tubular sensor main body extending in an axial direction and which can be attached to and detached from the sensor attachment portion, wherein the sensor main body has a pipe interior disposition portion which is a portion of the sensor main body located on a forward end side in the axial direction and has the shape of a tube extending in the axial direction and which is disposed in the gas flow pipe when the particulate sensor is attached to the sensor attachment portion, wherein the pipe interior disposition portion has one or more gas introduction openings which penetrate a wall portion of the pipe interior disposition portion and through which the gas under measurement is introduced into the sensor main body, wherein the one or more gas introduction openings are formed in the pipe interior disposition portion such that, when an outer circumferential surface of the pipe interior disposition portion is viewed in a circumferential direction, a circumferential region of the pipe interior disposition portion which includes all of the one or more gas introduction openings extends halfway or less in the circumferential direction of the pipe interior disposition portion, and wherein the particulate sensor has a sensor-side positioning portion which always sets the circumferential position of the sensor main body with respect to the sensor attachment portion to a fixed circumferential position when the particulate sensor is attached to the sensor attachment portion, whereby, when the particulate sensor is attached to the sensor attachment portion with the circumferential position of the sensor main body with respect to the sensor attachment portion being determined by the sensor-side positioning portion, the circumferential position of each of the one or more gas introduction openings within the gas flow pipe is always set to a fixed first circumferential position.

The above-described particulate sensor (5) includes a tubular sensor main body extending in an axial direction and which can be attached to and detached from the sensor attachment portion fixed to the gas flow pipe. The sensor main body has a pipe interior disposition portion extending in the axial direction. The pipe interior disposition portion has one or more gas introduction openings which penetrate a wall portion of the pipe interior disposition portion and through which the gas under measurement is introduced into the sensor main body.

The one or more gas introduction openings are formed in the pipe interior disposition portion such that all of the one or more gas introduction openings are disposed in the gas flow pipe in a state in which the particulate sensor is attached to the sensor attachment portion. In addition, the one or more gas introduction openings are formed in the pipe interior disposition portion such that, when the outer circumferential surface of the pipe interior disposition portion is viewed in the circumferential direction, the circumferential region of the pipe interior disposition portion which includes all the one or more gas introduction openings extends halfway or less in the circumferential direction of the pipe interior disposition portion.

If a change arises in the circumferential position of the sensor main body with respect to the sensor attachment portion at the time of attachment of the particulate sensor to the sensor attachment portion, naturally, the circumferential position (position in the circumferential direction of the sensor main body or the pipe interior disposition portion) of each of the one or more gas introduction openings within the gas flow pipe changes. Therefore, conventionally, when the particulate sensor is detached from the sensor attachment portion for some reason or the other and is reattached to the sensor attachment portion, the circumferential position of each of the one or more gas introduction openings within the gas flow pipe may change from the original position before having been detached. In such a case, even when the flow velocity of the gas under measurement flowing through the gas flow pipe does not change, the flow velocity of the gas under measurement introduced into the space inside the sensor main body through the one or more gas introduction openings (the amount of the gas introduced per unit time) changes from that before having been detached. As a result, the particulate sensor may fail to accurately detect the amount of particulates.

In view of the above, the above-described particulate sensor (5) has a sensor-side positioning portion which always sets the circumferential position of the sensor main body with respect to the sensor attachment portion to a fixed circumferential position when the particulate sensor is reattached to the sensor attachment portion. As a result, when the particulate sensor is attached to the sensor attachment portion with the circumferential position of the sensor main body with respect to the sensor attachment portion being determined by the sensor-side positioning portion, the circumferential position of each of the one or more gas introduction openings within the gas flow pipe is always set to the fixed first circumferential position.

Accordingly, the above-described particulate sensor ensures that the circumferential position of each of the one or more gas introduction openings within the gas flow pipe is always set to the fixed circumferential position when the particulate sensor is detached from the sensor attachment portion and is reattached to the sensor attachment portion. Therefore, in the case where the particulate sensor is regularly detached from the sensor attachment portion for the purpose of, for example, regular cleaning of the particulate sensor, when the particulate sensor is reattached to the sensor attachment portion after cleaning, the circumferential position of each of the one or more gas introduction openings within the gas flow pipe can always be set to the fixed circumferential position.

Notably, an example of the sensor attachment portion is a sensor attachment portion which has a pipe-side positioning portion which conforms to (corresponds to, can be mated with) the sensor-side positioning portion and ensures that, when the particulate sensor is attached to the sensor attachment portion with the sensor-side positioning portion and the pipe-side positioning portion being mated with each other, the circumferential position of the sensor main body with respect to the sensor attachment portion is always set to a fixed circumferential position.

In a case where the particulate sensor is attached to this sensor attachment portion, by attaching the particulate sensor to the sensor attachment portion such that the sensor-side positioning portion and the pipe-side positioning portion are mated with each other, an operation of "attaching the particulate sensor to the sensor attachment portion while setting the circumferential position of the sensor main body with respect to the sensor attachment portion to the fixed circumferential position by the sensor-side positioning portion" is realized As a result, the circumferential position of each of the one or more gas introduction openings within the gas flow pipe is always set to the fixed first circumferential position.

In yet another aspect (6), the present invention provides an attachment portion equipped gas flow pipe comprising a gas flow pipe and a sensor attachment portion which is fixed to the gas flow pipe and to which a particulate sensor is attached for detecting the amount of particulates contained in a gas under measurement flowing through the gas flow pipe, wherein the particulate sensor includes a tubular sensor main body extending in an axial direction and which can be attached to and detached from the sensor attachment portion, wherein the sensor main body has a pipe interior disposition portion which is a portion of the sensor main body located on a forward end side in the axial direction and has the shape of a tube extending in the axial direction and which is disposed in the gas flow pipe when the particulate sensor is attached to the sensor attachment portion, wherein the pipe interior disposition portion has one or more gas introduction openings which penetrate a wall portion of the pipe interior disposition portion and through which the gas under measurement is introduced into the sensor main body, wherein the one or more gas introduction openings are formed in the pipe interior disposition portion such that, when an outer circumferential surface of the pipe interior disposition portion is viewed in a circumferential direction, a circumferential region of the pipe interior disposition portion which includes all the one or more gas introduction openings extends halfway or less in the circumferential direction of the pipe interior disposition portion, and wherein the sensor attachment portion has a pipe-side positioning portion which always sets the circumferential position of the sensor main body with respect to the sensor attachment portion to a fixed circumferential position when the particulate sensor is attached to the sensor attachment portion, whereby, when the particulate sensor is attached to the sensor attachment portion with the circumferential position of the sensor main body with respect to the sensor attachment portion being determined by the pipe-side positioning portion, the circumferential position of each of the one or more gas introduction openings within the gas flow pipe is always set to a fixed first circumferential position.

The above-described attachment portion equipped gas flow pipe (6) comprises a gas flow pipe, and a sensor attachment portion which is fixed to the gas flow pipe and to which a particulate sensor is attached for detecting the amount of particulates contained in a gas under measurement flowing through the gas flow pipe.

The sensor attachment portion has a pipe-side positioning portion which always sets the circumferential position of the sensor main body with respect to the sensor attachment portion to a fixed circumferential position when the particulate sensor is attached to the sensor attachment portion. Therefore, when the particulate sensor is attached to the sensor attachment portion while the circumferential position of the sensor main body with respect to the sensor attachment portion is determined by the pipe-side positioning portion, the circumferential position of each of the one or more gas introduction openings within the gas flow pipe is always set to the fixed first circumferential position.

Accordingly, by using the above-described attachment portion equipped gas flow pipe, the circumferential position of each of the one or more gas introduction openings within the gas flow pipe can always be set to the fixed circumferential position when the particulate sensor is detached from the sensor attachment portion and reattached to the sensor attachment portion.

In a preferred embodiment (7) of the above-described attachment portion equipped gas flow pipe (6), the gas flow pipe has a hole-defining portion which defines a through hole penetrating a wall portion of the gas flow pipe and to which the sensor attachment portion is attached; the sensor attachment portion has a surrounding portion which has the shape of a tube extending in the axial direction and is disposed in the gas flow pipe, the surrounding portion surrounding a circumference of the pipe interior disposition portion of the sensor main body in a state in which the particulate sensor is attached to the sensor attachment portion; and, in the state in which the particulate sensor is attached to the sensor attachment portion, a surrounding forward end portion of the surrounding portion located furthest to the forward end side in the axial direction is located on the forward end side, in the axial direction, of the one or more gas introduction openings of the pipe interior disposition portion.

In the above-described attachment portion equipped gas flow pipe (7), the sensor attachment portion has a surrounding portion which has the shape of a tube extending in the axial direction and is disposed in the gas flow pipe. The surrounding portion surrounds a circumference of the pipe interior disposition portion of the sensor main body in a state in which the particulate sensor is attached to the sensor attachment portion fixed to the attachment portion equipped gas flow pipe (surrounds the circumference of the pipe interior disposition portion while being spaced from the pipe interior disposition portion).

Further, in a state in which the particulate sensor is attached to the sensor attachment portion, the surrounding forward end portion, which is a part of the surrounding portion located furthest to the forward end side in the axial direction, is located on the forward end side, in the axial direction, of the one or more gas introduction openings of the pipe interior disposition portion of the particulate sensor. Namely, in the state in which the particulate sensor is attached to the sensor attachment portion, the surrounding portion extends in the axial direction from the position of the hole-defining portion of the gas flow pipe to a position on the pipe interior disposition portion of the sensor main body, which position is located on the forward end side of the position of the one or more gas introduction openings.

In the state in which the particulate sensor is attached to the sensor attachment portion, for example, water remaining in the gas flow pipe may spray from the upstream side of the gas flow pipe toward the pipe interior disposition portion of the particulate sensor due to flow of the gas under measurement within the gas flow pipe from the upstream side toward the downstream side. In the above-described attachment portion equipped gas flow pipe, since the above-described surrounding portion is provided, water is less likely to enter the interior of the particulate sensor (the sensor main body) through the gas introduction opening(s). Namely, since the water spraying from the upstream side of the gas flow pipe toward the pipe interior disposition portion of the particulate sensor is received by the surrounding portion, water is less likely to enter the interior of the particulate sensor (the sensor main body) through the one or more gas introduction openings.

In a preferred embodiment (8) of the above-described attachment portion equipped gas flow pipe (7), when the particulate sensor is attached to the sensor attachment portion with the circumferential position of the sensor main body with respect to the sensor attachment portion being determined by the pipe-side positioning portion, the pipe-side positioning portion determines the circumferential position of the sensor main body such that the one or more gas introduction openings positioned at the first circumferential position are open toward a downstream side of the gas flow pipe; and the surrounding portion has a gas introduction window which is open toward the downstream side of the gas flow pipe and through which the one or more gas introduction openings can be visually recognized from the outside of the surrounding portion in a state in which the particulate sensor is attached to the sensor attachment portion.

In the above-described attachment portion equipped gas flow pipe (8), the pipe-side positioning portion of the sensor attachment portion is configured such that "when the particulate sensor is attached to the sensor attachment portion with the circumferential position of the sensor main body with respect to the sensor attachment portion being determined by the pipe-side positioning portion, the pipe-side positioning portion determines the circumferential position of the sensor main body such that the one or more gas introduction openings positioned at the first circumferential position are open toward the downstream side of the gas flow pipe." As a result, in the particulate sensor attached to the attachment portion equipped gas flow pipe, the one or more gas introduction openings are open toward the downstream side of the gas flow pipe.

Further, in the above-described attachment portion equipped gas flow pipe, the surrounding portion of the sensor attachment portion has a gas introduction window which is open toward the downstream side of the gas flow pipe. The gas introduction window is configured such that, in the state in which the particulate sensor is attached to the sensor attachment portion, the one or more gas introduction openings can be visually recognized from the outside of the surrounding portion through the gas introduction window.

By virtue of the above-described configuration, water spraying from the upstream side of the gas flow pipe toward the pipe interior disposition portion of the particulate sensor is received by a part of the surrounding portion located on the upstream side of the gas flow pipe, so that water is less likely to enter the interior of the particulate sensor (the sensor main body) through the one or more gas introduction openings. In addition, it becomes easier for the gas under measurement flowing through the gas flow pipe to be introduced into the one or more gas introduction openings through the gas introduction window.

In another aspect (9), the present invention provides a sensor attachment portion which is fixed to a gas flow pipe and to which a particulate sensor is attached for detecting the amount of particulates contained in a gas under measurement flowing through the gas flow pipe, wherein the particulate sensor includes a tubular sensor main body extending in an axial direction and which can be attached to and detached from the sensor attachment portion, wherein the sensor main body has a pipe interior disposition portion which is a portion of the sensor main body located on a forward end side in the axial direction and has the shape of a tube extending in the axial direction and which is disposed in the gas flow pipe when the particulate sensor is attached to the sensor attachment portion, wherein the pipe interior disposition portion has one or more gas introduction openings which penetrate a wall portion of the pipe interior disposition portion and through which the gas under measurement is introduced into the sensor main body, wherein the one or more gas introduction openings are formed in the pipe interior disposition portion such that, when an outer circumferential surface of the pipe interior disposition portion is viewed in a circumferential direction, a circumferential region of the pipe interior disposition portion which includes all the one or more gas introduction openings extends halfway or less in the circumferential direction of the pipe interior disposition portion, and wherein the sensor attachment portion has a pipe-side positioning portion which always sets the circumferential position of the sensor main body with respect to the sensor attachment portion to a fixed circumferential position when the particulate sensor is attached to the sensor attachment portion fixed to the gas flow pipe, whereby, when the particulate sensor is attached to the sensor attachment portion fixed to the gas flow pipe with the circumferential position of the sensor main body with respect to the sensor attachment portion being determined by the pipe-side positioning portion, the circumferential position of each of the one or more gas introduction openings within the gas flow pipe is always set to a fixed first circumferential position.

The above-described sensor attachment portion (9) is a sensor attachment portion which is fixed to a gas flow pipe and to which a particulate sensor is attached for detecting the amount of particulates contained in a gas under measurement flowing through the gas flow pipe.

This sensor attachment portion has a pipe-side positioning portion which always sets the circumferential position of the sensor main body with respect to the sensor attachment portion to a fixed circumferential position when the particulate sensor is attached to the sensor attachment portion. Therefore, when the particulate sensor is attached to the sensor attachment portion with the circumferential position of the sensor main body with respect to the sensor attachment portion being determined by the pipe-side positioning portion, the circumferential position of each of the one or more gas introduction openings within the gas flow pipe is always set to the fixed first circumferential position.

Accordingly, by using the above-described sensor attachment portion fixed to the gas flow pipe, the circumferential position of each of the one or more gas introduction openings within the gas flow pipe can always be set to the fixed circumferential position when the particulate sensor is detached from the sensor attachment portion and is reattached to the sensor attachment portion.

In a preferred embodiment (10) of the above-described sensor attachment portion (9), the gas flow pipe has a hole-defining portion which defines a through hole penetrating a wall portion of the gas flow pipe and to which the sensor attachment portion is attached; the sensor attachment portion has a surrounding portion which has the shape of a tube extending in the axial direction and is disposed in the gas flow pipe, the surrounding portion surrounding a circumference of the pipe interior disposition portion of the sensor main body in a state in which the particulate sensor is attached to the sensor attachment portion fixed to the gas flow pipe; and, in the state in which the particulate sensor is attached to the sensor attachment portion fixed to the gas flow pipe, a surrounding forward end portion of the surrounding portion located furthest to the forward end side in the axial direction is located on the forward end side, in the axial direction, of the one or more gas introduction openings of the pipe interior disposition portion.

The above-described sensor attachment portion (10) has a surrounding portion which has the shape of a tube extending in the axial direction and is disposed in the gas flow pipe. The surrounding portion surrounds a circumference of the pipe interior disposition portion of the sensor main body in a state in which the particulate sensor is attached to the sensor attachment portion fixed to the gas flow pipe (surrounds the circumference of the pipe interior disposition portion while being spaced from the pipe interior disposition portion).

Further, in a state in which the particulate sensor is attached to the sensor attachment portion fixed to the gas flow pipe, the surrounding forward end portion, which is a part of the surrounding portion located furthest to the forward end side in the axial direction, is located on the forward end side, in the axial direction, of the one or more gas introduction openings of the pipe interior disposition portion of the particulate sensor. Namely, in the state in which the particulate sensor is attached to the sensor attachment portion fixed to the gas flow pipe, the surrounding portion extends in the axial direction from the position of the hole-defining portion of the gas flow pipe to a position on the pipe interior disposition portion of the sensor main body, which position is located on the forward end side of the position of the one or more gas introduction openings.

In a state in which the particulate sensor is attached to the sensor attachment portion fixed to the gas flow pipe, for example, water remaining in the gas flow pipe may spray from the upstream side of the gas flow pipe toward the pipe interior disposition portion of the particulate sensor due to the flow of the gas under measurement flowing within the gas flow pipe from the upstream side toward the downstream side. Since the above-described surrounding portion is provided, water is less likely to enter the interior of the particulate sensor (the sensor main body) through the gas introduction opening(s). Namely, since water spraying from the upstream side of the gas flow pipe toward the pipe interior disposition portion of the particulate sensor is received by the surrounding portion, water is less likely to enter the interior of the particulate sensor (the sensor main body) through the one or more gas introduction openings.

DESCRIPTION OF REFERENCE NUMERALS AND SYMBOLS

Figure 1:
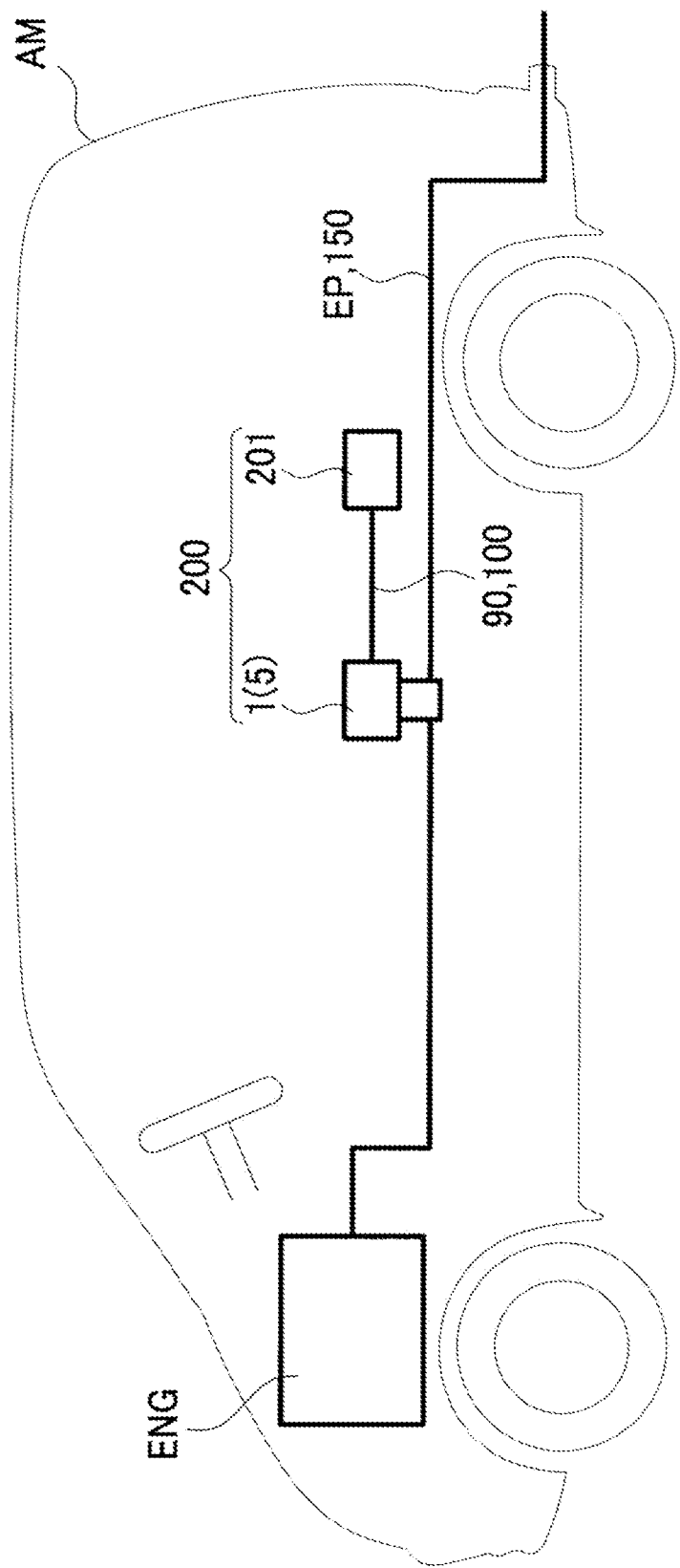
FIG. 1 is a schematic view showing a state in which a particulate sensor according to an embodiment is attached to an exhaust pipe of an engine of a vehicle.

Reference numerals used to identify various features in the drawings include the following.
1, 301, 501: particulate sensor
5, 305, 505: sensor main body
5A, 305A, 505A: pipe interior disposition portion
10, 310: outer metallic member
11, 311: first outer metallic member
11k, 311k: sensor-side positioning portion
11n: inner circumferential surface
15: second outer metallic member
25: first air introduction portion
27: second air introduction portion
30: inner metallic member
30n: outer circumferential surface
31: inner tube
35d: discharge counter electrode portion
35f: communication hole (orifice hole)
35h, 535h: gas introduction opening
37h: gas discharge opening
41: separator
47: insulating spacer
50: holder
55: insertion pipe
56: air passage hole
70: discharge electrode member
73: needle-shaped forward end portion
80: auxiliary electrode member
120, 420: sensor attachment portion
121, 421: pipe-side positioning portion
125, 425: surrounding portion
125h, 425h: gas introduction window
125s, 425s: surrounding forward end portion
150, 450: attachment portion equipped gas flow pipe
201: circuit section
AR: air
CP: ion
DS: discharge space
EP: exhaust pipe (gas flow pipe)
EPH: through hole
EPZ: hole-defining portion
EG: exhaust gas (gas under measurement)
FC1: first sensor internal air flow passage
FC2: second sensor internal air flow passage
GH: axial direction
GS: forward end side in axial direction
GK: rear end side in axial direction
IS: gas-under-measurement entering space
MX1: cylindrical mixing region (mixing space)
PVE: ground potential
PV1: reference potential
PV2: discharge potential
RA: circumferential range
S: particulate SC: electrified particulate
SA1: first sensor internal space
SA2: second sensor internal space

DETAILED DESCRIPTION OF THE PREFERRED EMBODIMENTS

Embodiment

An embodiment of the present invention will now be described in greater detail with reference to the drawings. However, the present invention should not be construed as being limited thereto.

Figure 2:
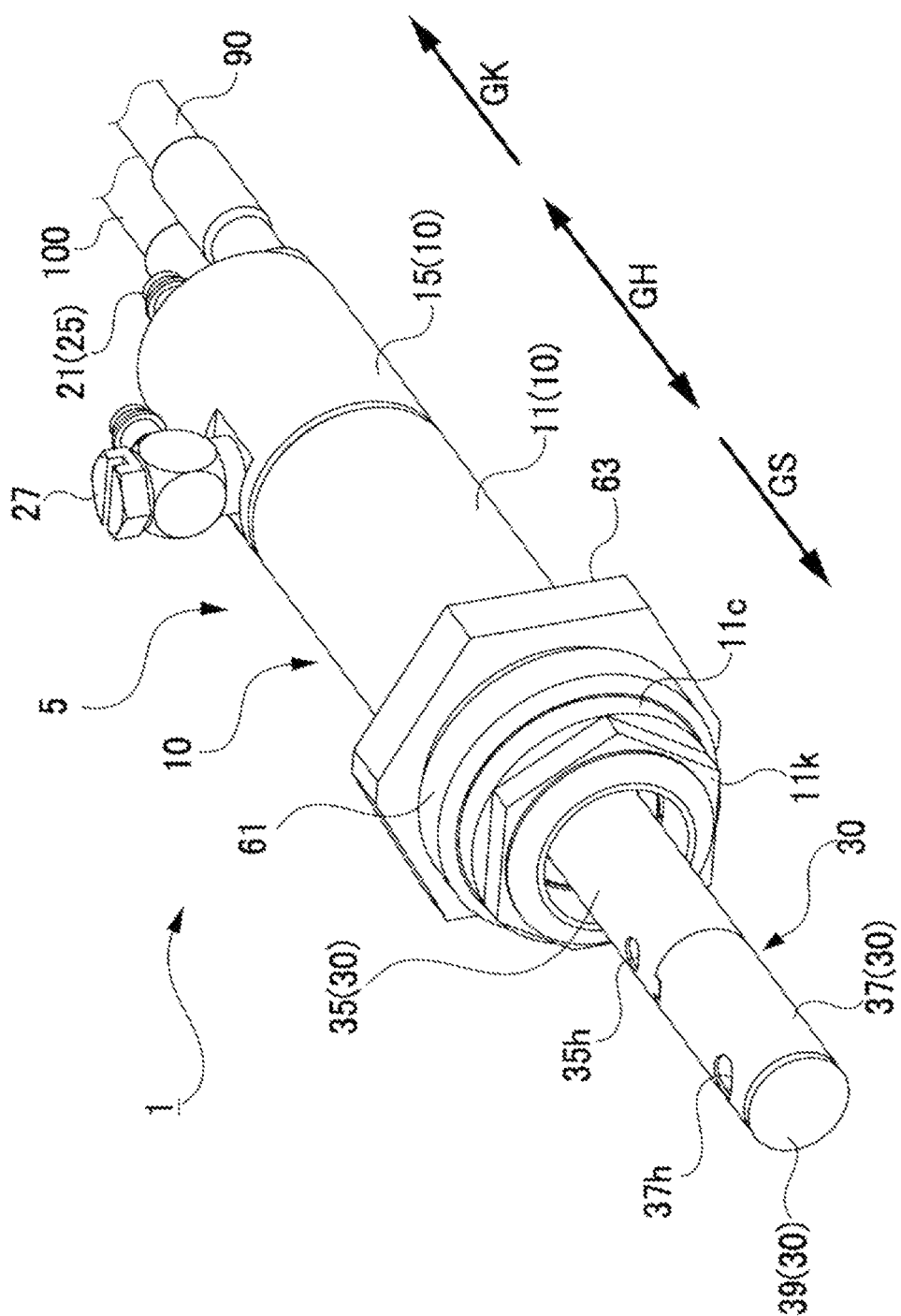
FIG. 2 is a perspective view of the particulate sensor according to the embodiment.
Figure 3:
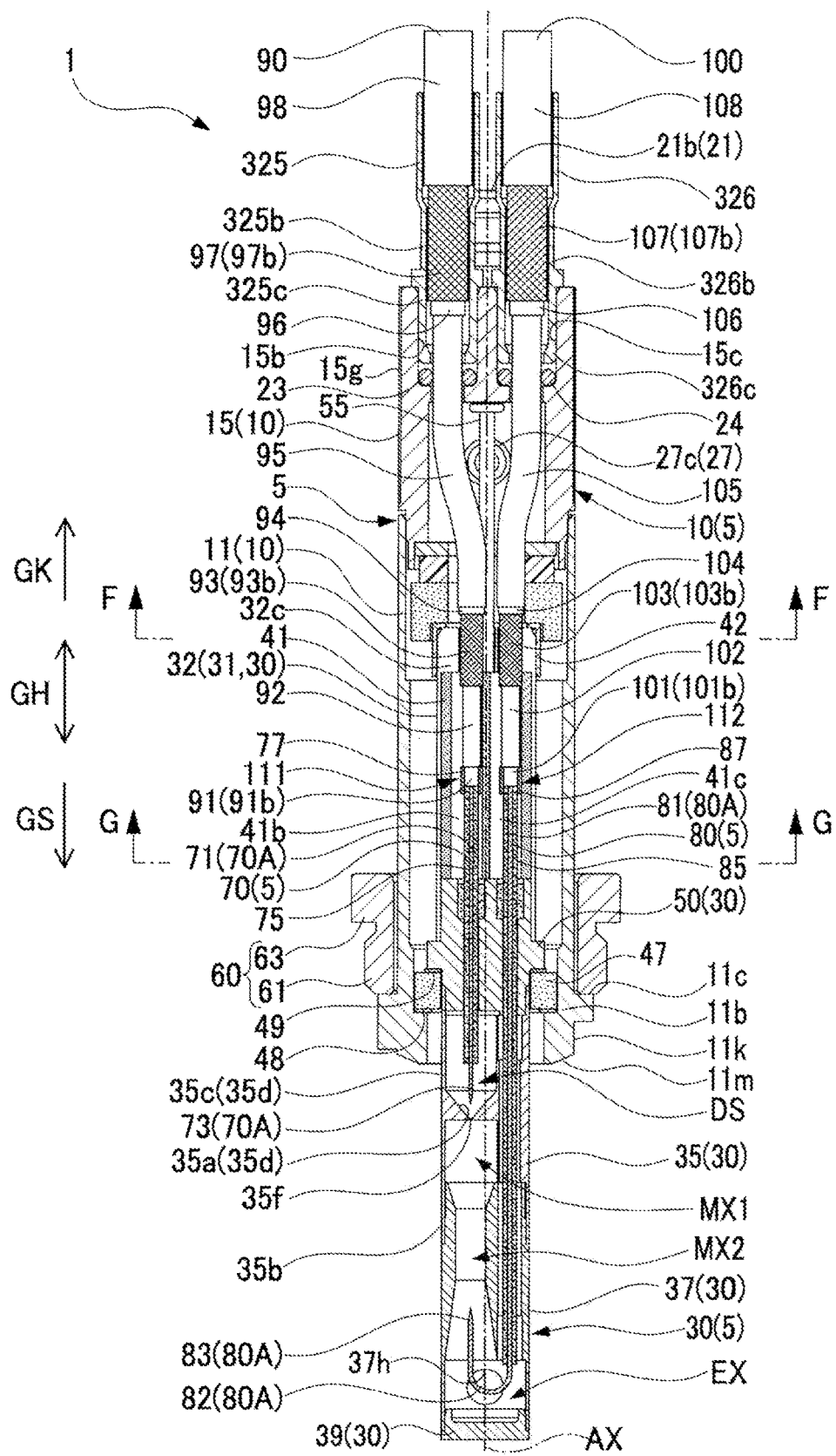
FIG. 3 is a longitudinal sectional view of the particulate sensor.
Figure 4:
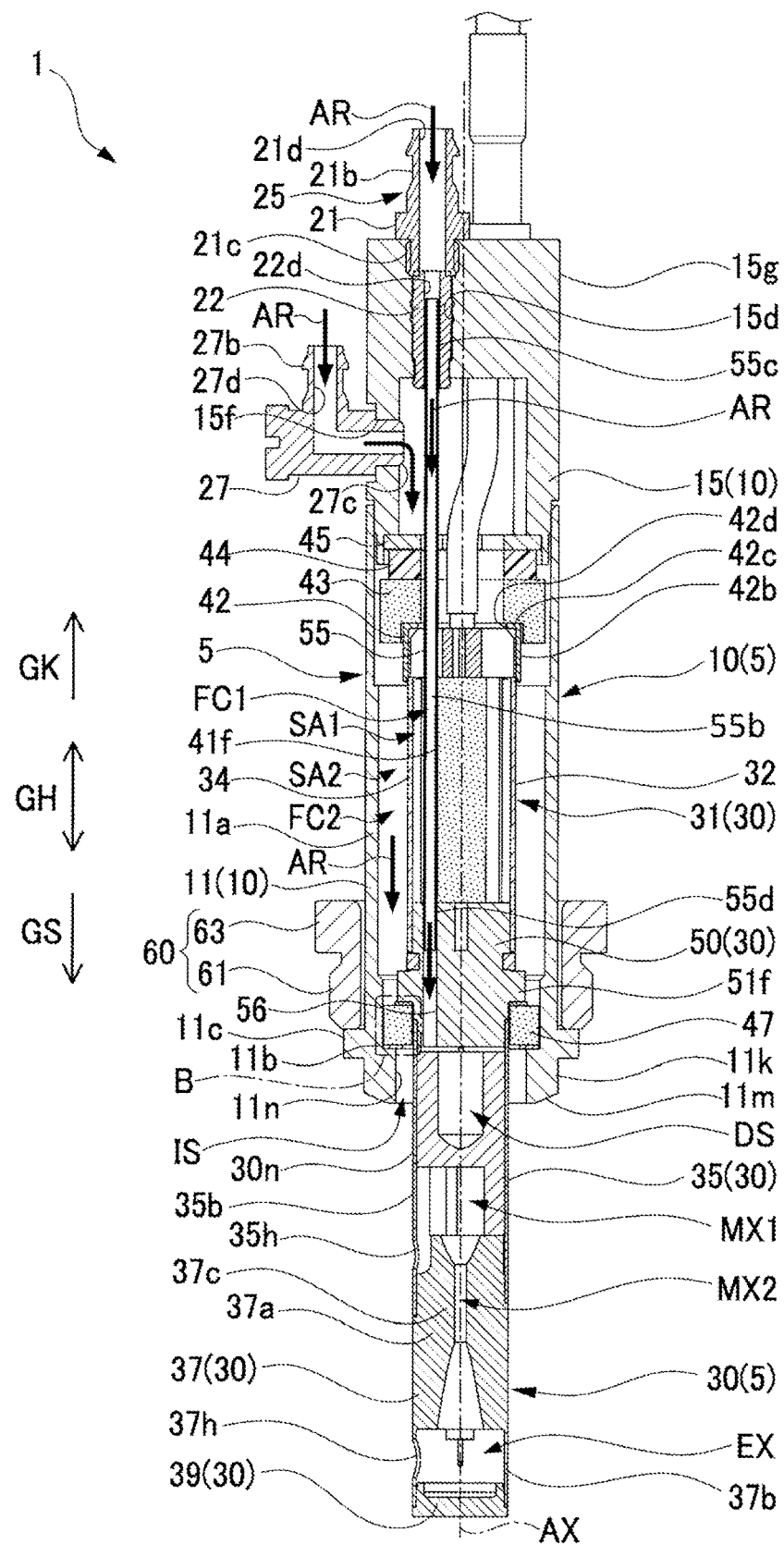
FIG. 4 is another longitudinal sectional view of the particulate sensor which is taken along a plane orthogonal to the section of FIG. 3.
Figure 5:
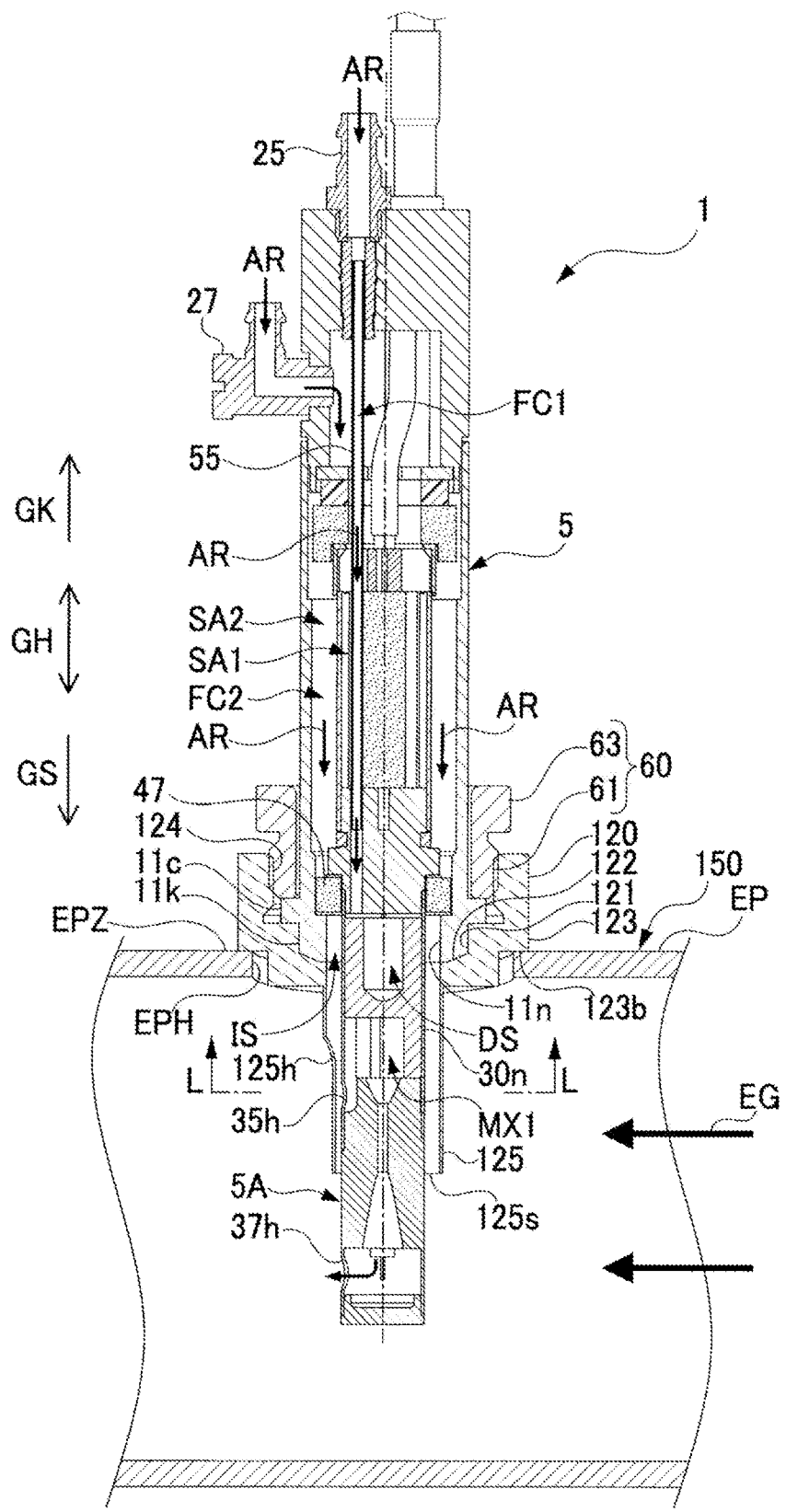
FIG. 5 is a longitudinal sectional view showing a state in which the particulate sensor is attached to the exhaust pipe.
Figure 6:
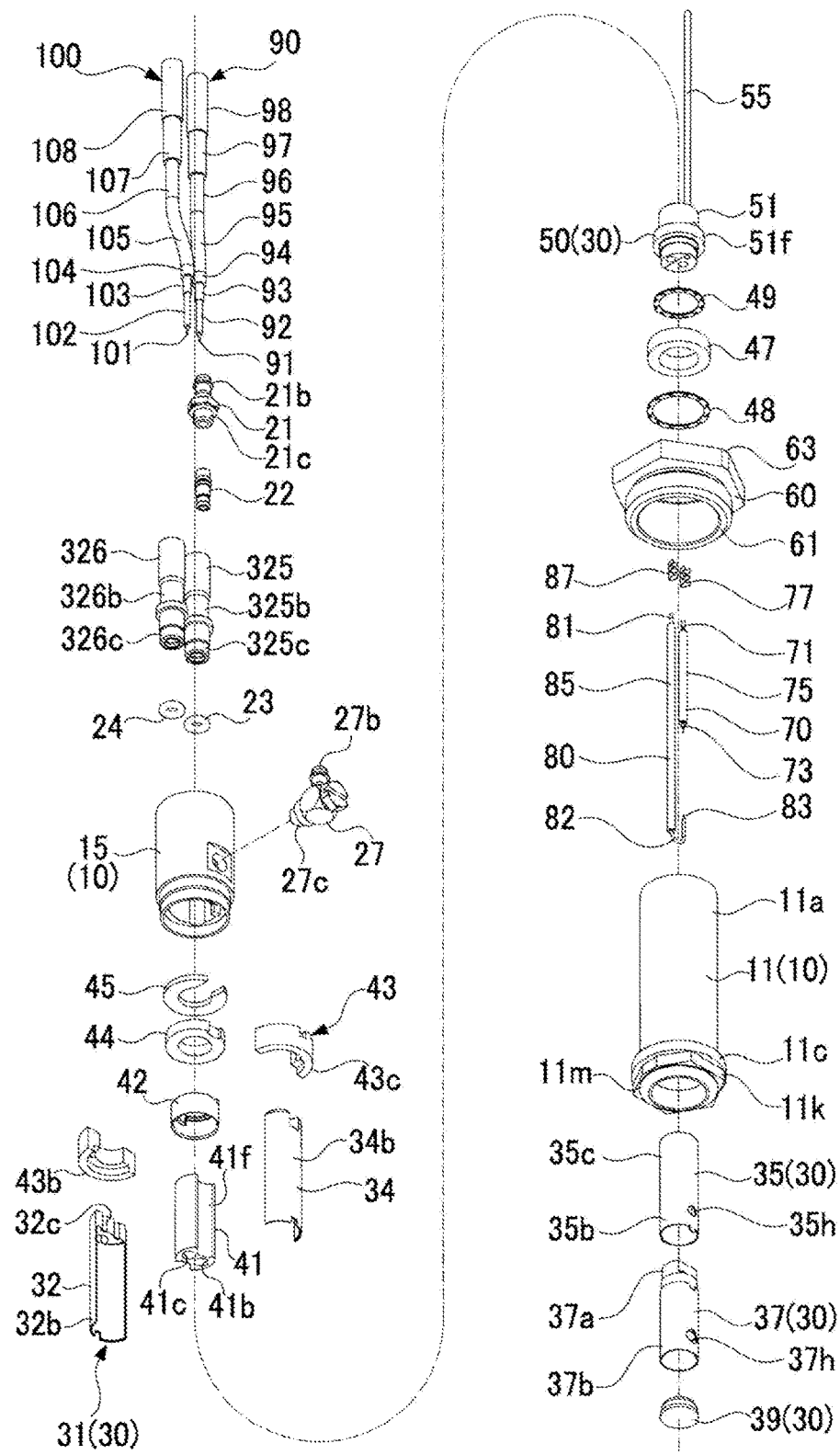
FIG. 6 is an exploded perspective view of the particulate sensor.

FIG. 1 is a schematic view showing a state in which a particulate sensor 1 according to the embodiment is attached to an exhaust pipe EP (an attachment portion equipped gas flow pipe 150) of an engine ENG (an internal combustion engine) mounted on a vehicle AM. FIG. 2 is a perspective view of the particulate sensor 1. FIG. 3 is a longitudinal sectional view of the particulate sensor 1. FIG. 4 is another longitudinal sectional view of the particulate sensor 1 which is taken along a plane orthogonal to the section of FIG. 3. FIG. 5 is a longitudinal sectional view showing a state in which a sensor main body 5 is attached to the exhaust pipe EP. FIG. 6 is an exploded perspective view of the particulate sensor 1. Notably, with respect to an axial direction GH of the particulate sensor 1 (the direction along the axial line AX; i.e., the vertical direction in FIGS. 3 to 5), the side (the lower side in FIGS. 3 to 5) where the particulate sensor 1 is attached to the exhaust pipe EP (the attachment portion equipped gas flow pipe 150) will be referred to as the forward end side GS, and the side (the upper side in FIGS. 3 to 5) where the particulate sensor 1 is disposed outside the exhaust pipe EP (the attachment portion equipped gas flow pipe 150) will be referred to as the rear end side GK.

First, a particulate detection system 200 of the present embodiment will be described. As shown in FIG. 1, the particulate detection system 200 includes the particulate sensor 1 and a circuit section 201 for driving the particulate sensor 1.

The particulate sensor 1 is attached to the exhaust pipe EP (the attachment portion equipped gas flow pipe 150) of the engine ENG (internal combustion engine) mounted on the vehicle AM, and detects particulates S, such as soot, contained in exhaust gas EG (gas under measurement) flowing through the exhaust pipe EP. Specifically, the sensor main body 5 of the particulate sensor 1 is attached to a sensor attachment portion 120 fixed to the exhaust pipe EP, whereby a portion of the sensor main body 5 on the forward end side GS is disposed in the exhaust pipe EP (see FIG. 5) and is exposed to the exhaust gas EG.

The circuit section 201 is connected to the sensor main body 5 of the particulate sensor 1 through a first cable 90 and a second cable 100 external to the exhaust pipe EP. The circuit section 201 includes a circuit for driving the particulate sensor 1 and a circuit for detecting a signal current which will be described below.

The particulate sensor 1 of the present embodiment will now be described in detail. The particulate sensor 1 includes the sensor main body 5 and cables (the first cable 90 and the second cable 100) for electrically connecting the sensor main body 5 and the circuit section 201 (see FIGS. 2 and 3). The sensor main body 5 has the shape of a tube extending in the axial direction GH and is attached to a sensor attachment portion 120 fixed to the exhaust pipe EP which is formed of a metal and maintained at ground potential PVE (see FIGS. 5 and 8). The first cable 90 and the second cable 100 extending from the sensor main body 5 are connected to the external circuit section 201 (see FIG. 8).

The sensor main body 5 includes an outer metallic member 10, an inner metallic member 30, a discharge electrode member 70, and an auxiliary electrode member 80 (see FIG. 3). The outer metallic member 10 is formed of a metal and has the shape of a cylinder extending in the axial direction GH. The outer metallic member 10 surrounds the circumference of the inner metallic member 30 while being separated and insulated from the inner metallic member 30. The outer metallic member 10 is attached to the sensor attachment portion 120 fixed (welded) to the exhaust pipe EP maintained at ground potential PVE, whereby the outer metallic member 10 is maintained at ground potential PVE (see FIGS. 5 and 8). The outer metallic member 10 is composed of a first outer metallic member 11 and a second outer metallic member 15 welded to an end of the first outer metallic member 11 on the rear end side GK. Notably, the sensor attachment portion 120 is also maintained at ground potential PVE.

As shown in FIG. 6, the first outer metallic member 11 is a cylindrical member formed of stainless steel. The first outer metallic member 11 includes a cylindrical first main body 11a, an annular flange portion 11c located on the forward end side GS of the first main body 11a and bulging radially outward, an annular outer holding portion 11b (see FIG. 4) bulging radially inward from the flange portion 11c, a sensor-side positioning portion 11k (see FIG. 10) located on the forward end side GS of the outer holding portion 11b and having a heptagonal shape in plane view, and a seal portion 11m located on the forward end side GS of the sensor-side positioning portion 11k (see FIGS. 3 and 4).

Figure 10:
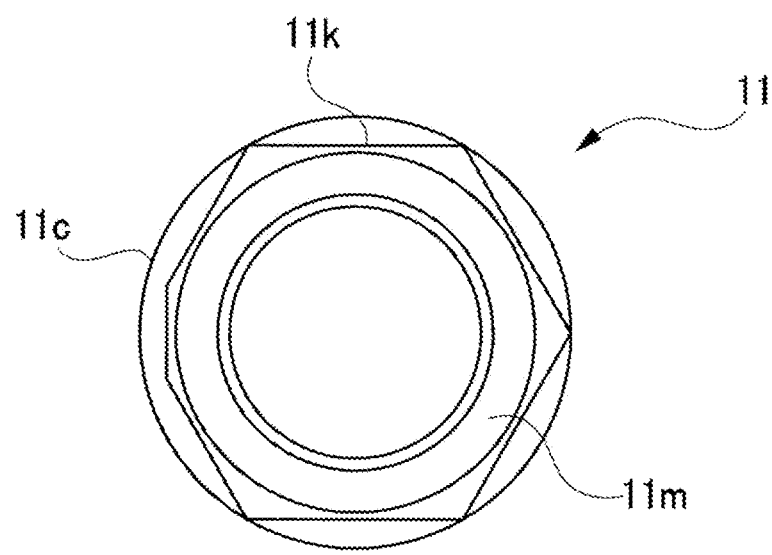
FIG. 10 is a bottom view (plane view of a forward end portion) of a first outer metallic member according to the embodiment.

The sensor-side positioning portion 11k is a portion for determining the circumferential position (position around the axial line AX) of the sensor main body 5 with respect to the sensor attachment portion 120 when the particulate sensor 1 is attached to the sensor attachment portion 120 described below. As shown in FIG. 10, the sensor-side positioning portion 11k originally had a regular hexagonal shape in plane view and its one corner (present on the left-hand side in FIG. 10) has been chamfered, so that the sensor-side positioning portion 11k has a heptagonal shape in plane view.

The sensor-side positioning portion 11k having such a shape in plane view (hereinafter referred to as the "plane view shape") is not rotationally symmetric about the center axis of the first outer metallic member 11 (about the axial line AX of the particulate sensor 1). Namely, when the sensor-side positioning portion 11k is rotated one turn (rotated) 360° about the center axis of the first outer metallic member 11, in the middle of the rotation, the sensor-side positioning portion 11k does not have the same plane view shape as the plane view shape before being rotated. Specifically, the sensor-side positioning portion 11k has the plane view shape shown in FIG. 10 only one time when the sensor-side positioning portion 11k is rotated about the center axis of the first outer metallic member 11 (about the axial line AX of the particulate sensor 1).

Notably, if the sensor-side positioning portion has a regular hexagonal shape in plane view, the plane view shape of the sensor-side positioning portion is rotationally symmetric about the center axis of the first outer metallic member 11 (about the axial line AX of the particulate sensor). Specifically, when the sensor-side positioning portion having a regular hexagonal shape in plane view is rotated one turn (rotated 360°) about the center axis of the first outer metallic member (about the axial line AX of the particulate sensor), in the middle of the rotation, the sensor-side positioning portion has the same plane view shape as the plane view shape before the rotation at five positions.

A fastening member 60 described below is disposed on the circumference of the first main body 11a to be rotatable with respect the first outer metallic member 11. The outer holding portion 11b holds a cylindrical insulating spacer 47 formed of alumina in cooperation with an inner holding portion 51f of an inner metallic member 30 (holder 50) described below. The outer holding portion 11b comes into engagement with the insulating spacer 47 from the forward end side GS via an annular first intervening member 48 over the entire circumference of the insulating spacer 47.

The flange portion 11c is a portion against which a forward end portion of the fastening member 60 abuts when the particulate sensor 1 (the sensor main body 5) is attached to the sensor attachment portion 120 fixed (welded) to the exhaust pipe EP through use of the fastening member 60 as described below. The seal portion 11m has an annular taper surface tapered such that the diameter of the seal portion 11m decreases toward the forward end side GS in the axial direction GH. When the particulate sensor 1 (the sensor main body 5) is attached to the sensor attachment portion 120 fixed (welded) to the exhaust pipe EP as described below, the seal portion 11m comes into contact with a seating surface portion 122 of the sensor attachment portion 120, thereby establishing a gastight seal between the first outer metallic member 11 and the sensor attachment portion 120.

The insulating spacer 47 is formed of insulating ceramic and is disposed between the inner metallic member 30 (specifically, the annular inner holding portion 51f of the holder 50) and the outer metallic member 10 (specifically, the annular outer holding portion 11b of the first outer metallic member 11) so as to electrically insulate the inner metallic member 30 and the outer metallic member 10 from each other.

The first intervening member 48 is formed of a metal (specifically, stainless steel) and has the shape of a flat annular plate. The first intervening member 48 intervenes between the outer metallic member 10 (specifically, the outer holding portion 11b of the first outer metallic member 11) and the insulating spacer 47 (specifically, a forward end surface 47b of the insulating spacer 47) while being in contact with the outer metallic member 10 and the insulating spacer 47 (being sandwiched therebetween in the axial direction GH). This configuration allows stable insertion of the first intervening member 48 between the outer metallic member 10 and the insulating spacer 47.

The particulate sensor 1 has an approximately cylindrical gas-under-measurement entering space IS (see FIGS. 4 and 5) on the forward end side GS of the sensor main body 5 in the axial direction GH. The gas-under-measurement entering space IS is formed between an inner circumferential surface 11n of the outer metallic member 10 (the first outer metallic member 11) and an outer circumferential surface 30n of the inner metallic member 30 (the gas-under-measurement entering space IS is surrounded by the inner circumferential surface 11n of the outer metallic member 10 and the outer circumferential surface 30n of the inner metallic member 30). The exhaust gas EG (gas under measurement) flowing through the exhaust pipe EP enters the gas-under-measurement entering space IS. Notably, the exhaust gas EG (gas under measurement) flowing through the exhaust pipe EP enters the gas-under-measurement entering space IS through, for example, a gas introduction window 125h of a surrounding portion 125 of the sensor attachment portion 120 (see FIG. 13).

As shown in FIG. 6, the second outer metallic member 15 is a cylindrical member formed of stainless steel, extends in the axial direction GH, and has a first through hole 15b and a second through hole 15c which penetrate a rear end portion 15g of the second outer metallic member 15 (see FIG. 3). Further, as shown in FIG. 4, the second outer metallic member 15 has a third through hole 15d which penetrates the rear end portion 15g of the second outer metallic member 15 in the axial direction GH and a fourth through hole 15f which penetrates a central portion of the second outer metallic member 15 in the radial direction (direction orthogonal to the axial direction GH). A forward end portion of the second outer metallic member 15 is inserted, from the rear end side GK, into the first main body 11a of the first outer metallic member 11 and is welded thereto over the entire circumference.

Further, the second outer metallic member 15 has a first air introduction portion 25 and a second air introduction portion 27 (see FIGS. 2, 4, and 5). The first air introduction portion 25 and the second air introduction portion 27 are portions through which air AR is introduced into a space inside the sensor main body 5 from the outside of the sensor main body 5.

The first air introduction portion 25 has the shape of a tube extending in the axial direction GH and includes a tubular tube attachment member 21 and a tubular seal member 22. The tube attachment member 21 protrudes from a rear end portion of the second outer metallic member 15 toward the rear end side GK. The seal member 22 is located on the forward end side GS of the tube attachment member 21 so as to be adjacent to the tube attachment member 21. The tube attachment member 21 is formed of a metal and has an external thread portion 21c which comes into screw engagement with an internal thread formed in the third through hole 15d, and an attachment portion 21b which is located on the rear end side GK of the second outer metallic member 15 and to which an air tube 40b described below is attached. The tube attachment member 21 is fixed to the second outer metallic member 15 as a result of the external thread portion 21c being brought into screw engagement with the internal thread formed in the third through hole 15d of the second outer metallic member 15 (see FIG. 4). The seal member 22 is formed of an electrically insulating rubber and is inserted (press-fitted) into the third through hole 15d such that the seal member 22 is in contact with a forward end portion (the external thread portion 21c) of the tube attachment member 21.

Figure 8:
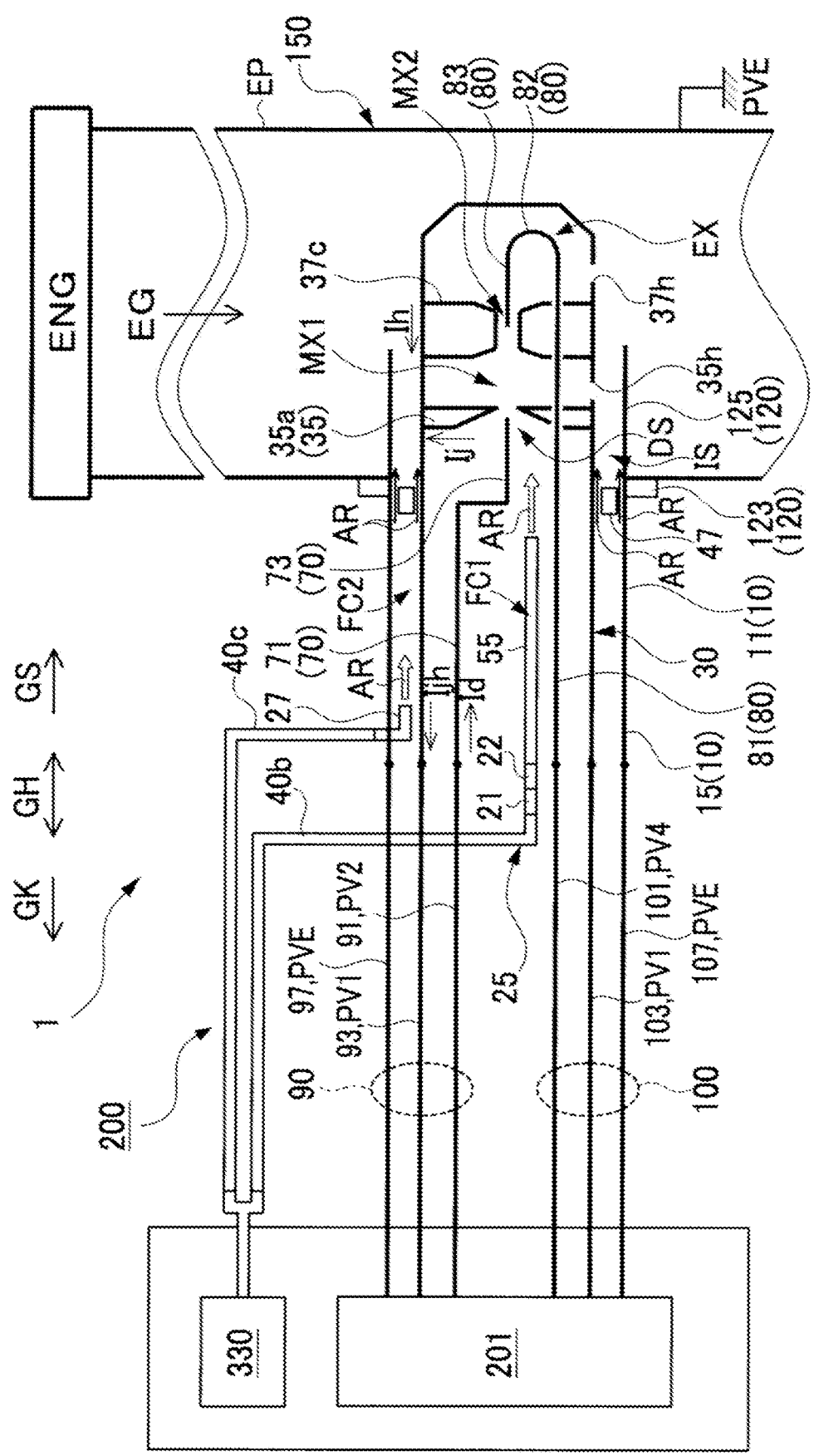
FIG. 8 is a diagram schematically showing the configuration of a particulate detection system according to the embodiment.

One end portion of an air tube 40b is connected to the attachment portion 21b of the tube attachment member 21 (see FIG. 8). The other end portion of the air tube 40b is connected to a pump 330 disposed externally (see FIG. 8). As a result, clean air (compressed air) AR from the pump 330 is supplied to the first air introduction portion 25 through the air tube 40b. The air AR supplied to the first air introduction portion 25 is introduced into an air passage hole 21d which is an axial hole of the tube attachment member 21 and an air passage hole 22d which is an axial hole of the seal member 22, whereby the air AR is introduced into the interior of the sensor main body 5 (see FIG. 4).

The second air introduction portion 27 is formed of a metal and has a tubular attachment portion 27b extending in the axial direction GH and a tubular external thread portion 27c which comes into screw engagement with an internal thread formed in the fourth through hole 15f. The second air introduction portion 27 is fixed to the second outer metallic member 15 as a result of the external thread portion 27c being brought into screw engagement with the internal thread formed in the fourth through hole 15f of the second outer metallic member 15. The second air introduction portion 27 has an air passage hole 27d formed therein. The air passage hole 27d has an L-shaped cross section and penetrates the second air introduction portion 27 from the attachment portion 27b to the external thread portion 27c.

One end portion of an air tube 40c described below is connected to the attachment portion 27b of the second air introduction portion 27 (see FIG. 8). The other end portion of the air tube 40c is connected to the pump 330 disposed externally (see FIG. 8). As a result, the clean air (compressed air) AR from the pump 330 is supplied to the second air introduction portion 27 through the air tube 40c. The air AR supplied to the second air introduction portion 27 passes through the interior of the air passage hole 27d and is introduced into the interior of the sensor main body 5 (the interior of the second outer metallic member 15) (see FIG. 4).

The two cables (the first cable 90 and the second cable 100) extend from the interior of the second outer metallic member 15 toward the rear end side GK. Specifically, as shown in FIG. 3, a first O-ring 23 and a cylindrical first retainer 325 are inserted into a rear end side GK portion of the first through hole 15b of the second outer metallic member 15. The first cable 90 is held by the second outer metallic member 15 in a state in which the first cable 90 extends through the first O-ring 23 and the first retainer 235.

The first retainer 325 has a cylindrical insertion portion 325c located on the forward end side GS in the axial direction GH and a cylindrical crimp-connection portion 325b located on the rear end side GK of the insertion portion 325c. The insertion portion 325c is inserted into the first through hole 15b of the second outer metallic member 15 from the rear end side GK. The crimp-connection portion 325b is connected to a forward end portion 97b of a first ground potential wiring conductor 97. The crimp-connection portion 325b is crimped radially inward in a state in which the forward end portion 97b of the first ground potential wiring conductor 97 is inserted into the crimp-connection portion 325b, whereby the crimp-connection portion 325b is pressed against the forward end portion 97b of the first ground potential wiring conductor 97 and electrically communicates therewith. A portion (including the crimp-connection portion 325b) of the first retainer 325 located on the rear end side GK of the insertion portion 325c protrudes to the outside of the second outer metallic member 15 from the rear end of the second outer metallic member 15.

Further, a second O-ring 24 and a cylindrical second retainer 326 are inserted into a rear end side GK portion of the second through hole 15c of the second outer metallic member 15. The second cable 100 is held by the second outer metallic member 15 in a state in which the second cable 100 extends through the second O-ring 24 and the second retainer 326.

The second retainer 326 has a cylindrical insertion portion 326c located on the forward end side GS in the axial direction GH and a cylindrical crimp-connection portion 326b located on the rear end side GK of the insertion portion 326c. The insertion portion 326c is inserted into the second through hole 15c of the second outer metallic member 15 from the rear end side GK. The crimp-connection portion 326b is connected to a forward end portion 107b of a second ground potential wiring conductor 107. The crimp-connection portion 326b is crimped radially inward in a state in which the forward end portion 107b of the second ground potential wiring conductor 107 is inserted into the crimp-connection portion 326b, whereby the crimp-connection portion 326b is pressed against the forward end portion 107b of the second ground potential wiring conductor 107 and electrically communicates therewith. A portion (including the crimp-connection portion 326b) of the second retainer 326 located on the rear end side GK of the insertion portion 326c protrudes to the outside of the second outer metallic member 15 from the rear end of the second outer metallic member 15.

Figure 7:
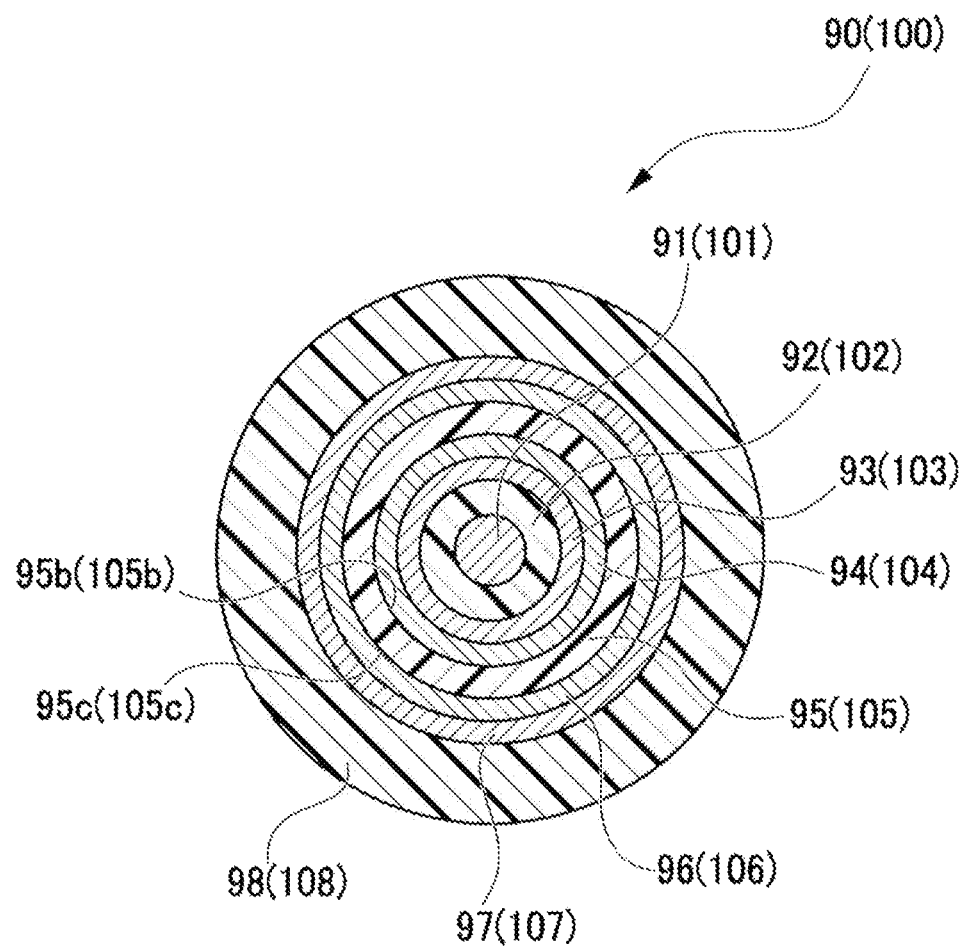
FIG. 7 is a cross sectional view of a first cable and a second cable.

Next, the first cable 90 and the second cable 100 will be described. FIG. 7 is a cross sectional view of the first cable 90 and the second cable 100.

The first cable 90 is a tri-axial cable. As shown in FIGS. 3 and 7, the first cable 90 includes a discharge potential wiring conductor 91 formed of a copper core wire, a cylindrical first reference potential wiring conductor 93 located radially outward of the discharge potential wiring conductor 91 and formed of braided copper thin wires, and a first insulator layer 92 formed of PTFE, surrounding the circumference of the discharge potential wiring conductor 91. The first insulator layer 92 is disposed between the discharge potential wiring conductor 91 and the first reference potential wiring conductor 93 in order to insulate the conductors 91, 93 from each other. Further, the first cable 90 includes the cylindrical first ground potential wiring conductor 97 surrounding the circumference of the first reference potential wiring conductor 93 and formed of braided copper thin wires, and a second insulator layer 95 formed of PTFE, surrounding the circumference of the first reference potential wiring conductor 93. The second insulator layer 95 is disposed between the first reference potential wiring conductor 93 and the first ground potential wiring conductor 97 in order to insulate the conductors 93, 97 from each other.

Further, as shown in FIG. 7, the first cable 90 includes a first semi-conductive covering layer 94 and a second semi-conductive covering layer 96. The first semi-conductive covering layer 94 is in close contact with a radially inner surface 95b of the second insulator layer 95, covers the radially inner surface 95b, and is in contact with the first reference potential wiring conductor 93. The second semi-conductive covering layer 96 is in close contact with a radially outer surface 95c of the second insulator layer 95, covers the radially outer surface 95c, and is in contact with the first ground potential wiring conductor 97. The first semi-conductive covering layer 94 and the second semi-conductive covering layer 96 are formed of carbon-containing FEP and are semi-conductive (having electrical conductivity). Further, the first cable 90 includes an outer insulating cover layer 98 formed of FEP (fluorinated ethylene propylene) and covering the circumference of the first ground potential wiring conductor 97. As described above, the first cable 90 is a double surrounding cable in which the discharge potential wiring conductor 91 is surrounded doubly by the first reference potential wiring conductor 93 and the first ground potential wiring conductor 97, and the first reference potential wiring conductor 93 is surrounded by the first ground potential wiring conductor 97.

A forward end 91b of the discharge potential wiring conductor 91 of the first cable 90 extends toward the forward end side (upper side in FIG. 3) of the first cable 90 beyond the forward end of the first insulator layer 92, whereby the forward end 91b of the discharge potential wiring conductor 91 is exposed to the outside of the first cable 90. As shown in FIG. 3, the forward end 91b of the discharge potential wiring conductor 91 is connected to a rear end portion (exposed portion) of a first extension portion 71 of a discharge electrode member 70 as a result of crimp connection by a first connection terminal 77. As a result, the discharge potential wiring conductor 91 electrically communicates with the discharge electrode member 70.

Notably, a connection portion where the forward end 91b of the discharge potential wiring conductor 91 and the rear end portion (exposed portion) of the first extension portion 71 of the discharge electrode member 70 are connected through the first connection terminal 77 will be referred to as a discharge potential connection portion 111 (see FIG. 3).

Also, a forward end 93b of the first reference potential wiring conductor 93 extends toward the forward end side of the first cable 90 beyond the forward end of the first semi-conductive covering layer 94, whereby the forward end 93b of the first reference potential wiring conductor 93 is exposed to the outside of the first cable 90. As shown in FIG. 3, the forward end 93b of the first reference potential wiring conductor 93 is connected to an inner tube 31 of the inner metallic member 30 (reference potential member). As a result, the first reference potential wiring conductor 93 electrically communicates with the inner metallic member 30 (reference potential member).

Further, a forward end 97b of the first ground potential wiring conductor 97 extends toward the forward end side of the first cable 90 beyond the forward end of the outer insulating cover layer 98, whereby the forward end 97b of the first ground potential wiring conductor 97 is exposed to the outside of the first cable 90. As shown in FIG. 3, the tubular first retainer 325 formed of a metal and inserted into the first through hole 15b of the second outer metallic member 15 is fitted onto the forward end 97b of the first ground potential wiring conductor 97, and the first ground potential wiring conductor 97 is connected to the second outer metallic member 15 (ground potential member) through the first retainer 325. As a result, the first ground potential wiring conductor 97 electrically communicates with the outer metallic member 10 (ground potential member).

Next, the second cable 100 will be described. The second cable 100 is also a tri-axial cable. As shown in FIGS. 3 and 7, the second cable 100 includes an auxiliary potential wiring conductor 101 formed of a copper core wire, a cylindrical second reference potential wiring conductor 103 located radially outward of the auxiliary potential wiring conductor 101 and formed of braided copper thin wires, and a first insulator layer 102 formed of PTFE, surrounding the circumference of the auxiliary potential wiring conductor 101. The first insulator layer 102 is disposed between the auxiliary potential wiring conductor 101 and the second reference potential wiring conductor 103 in order to insulate the conductors 101, 103 from each other. Further, the second cable 100 includes the cylindrical second ground potential wiring conductor 107 surrounding the circumference of the second reference potential wiring conductor 103 and formed of braided copper thin wires, and a second insulator layer 105 formed of PTFE, surrounding the circumference of the second reference potential wiring conductor 103. The second insulator layer 105 is disposed between the second reference potential wiring conductor 103 and the second ground potential wiring conductor 107 in order to insulate the conductors 103, 107 from each other.

Further, as shown in FIG. 7, the second cable 100 includes a first semi-conductive covering layer 104 and a second semi-conductive covering layer 106. The first semi-conductive covering layer 104 is in close contact with a radially inner surface 105b of the second insulator layer 105, covers the radially inner surface 105b, and is in contact with the second reference potential wiring conductor 103. The second semi-conductive covering layer 106 is in close contact with a radially outer surface 105c of the second insulator layer 105, covers the radially outer surface 105c, and is in contact with the second ground potential wiring conductor 107. The first semi-conductive covering layer 104 and the second semi-conductive covering layer 106 are formed of carbon-containing FEP and are semi-conductive (having electrical conductivity). Further, the second cable 100 includes an outer insulating cover layer 108 formed of FEP and covering the circumference of the second ground potential wiring conductor 107. As described above, the second cable 100 is a double surrounding cable in which the auxiliary potential wiring conductor 101 is surrounded doubly by the second reference potential wiring conductor 103 and the second ground potential wiring conductor 107, and the second reference potential wiring conductor 103 is surrounded by the second ground potential wiring conductor 107.

A forward end 101b of the auxiliary potential wiring conductor 101 of the second cable 100 extends toward the forward end side (upper side in FIG. 3) of the second cable 100 beyond the forward end of the first insulator layer 102, whereby the forward end 101b of the auxiliary potential wiring conductor 101 is exposed to the outside of the second cable 100. As shown in FIG. 3, the forward end 101b of the auxiliary potential wiring conductor 101 is connected to a rear end portion (exposed portion) of a second extension portion 81 of an auxiliary electrode member 80 as a result of crimp connection by a second connection terminal 87. As a result, the auxiliary potential wiring conductor 101 electrically communicates with the auxiliary electrode member 80.

Notably, a connection portion where the forward end 101b of the auxiliary potential wiring conductor 101 and the rear end portion (exposed portion) of the second extension portion 81 of the auxiliary electrode member 80 are connected through the second connection terminal 87 will be referred to as an auxiliary potential connection portion 112 (see FIG. 3).

Also, a forward end 103b of the second reference potential wiring conductor 103 extends toward the forward end side of the second cable 100 beyond the forward end of the first semi-conductive covering layer 104, whereby the forward end 103b of the second reference potential wiring conductor 103 is exposed to the outside of the second cable 100. As shown in FIG. 3, the forward end 103b of the second reference potential wiring conductor 103 is connected to the inner tube 31 of the inner metallic member 30 (reference potential member). As a result, the second reference potential wiring conductor 103 electrically communicates with the inner metallic member 30 (reference potential member).

Further, a forward end 107b of the second ground potential wiring conductor 107 extends toward the forward end side of the second cable 100 beyond the forward end of the outer insulating cover layer 108, whereby the forward end 107b of the second ground potential wiring conductor 107 is exposed to the outside of the second cable 100. As shown in FIG. 3, the tubular second retainer 326 formed of a metal and inserted into the second through hole 15c of the second outer metallic member 15 is fitted onto the forward end 107b of the second ground potential wiring conductor 107, and the second ground potential wiring conductor 107 is connected to the second outer metallic member 15 (ground potential member) through the second retainer 326. As a result, the second ground potential wiring conductor 107 electrically communicates with the outer metallic member 10 (ground potential member).

Next, the fastening member 60 will be described. This fastening member 60 is rotatably disposed on the circumference of the first main body 11a of the first outer metallic member 11. The fastening member 60 is a tubular member having an external thread portion 61 and a tool engagement portion 63 located on the rear end side GK of the external thread portion 61 (see FIGS. 2 to 6). The external thread portion 61 is a cylindrical portion having an external thread formed on the outer circumference thereof. Meanwhile, the tool engagement portion 63 is a tubular portion having a hexagonal external shape. When the sensor main body 5 is attached to the sensor attachment portion 120 fixed to the exhaust pipe EP, a tool is engaged with the tool engagement portion 63.

The exhaust pipe EP has a hole-defining portion EPZ which defines a through hole EPH penetrating the wall of the exhaust pipe EP (see FIG. 5). The sensor attachment portion 120 is attached (welded and fixed) to the hole-defining portion EPZ. When the sensor main body 5 of the particulate sensor 1 is attached to the sensor attachment portion 120, a portion of the sensor main body 5 located on the forward end side GS in the axial direction GH is passed through the hole-defining portion EPZ.

Figure 13:
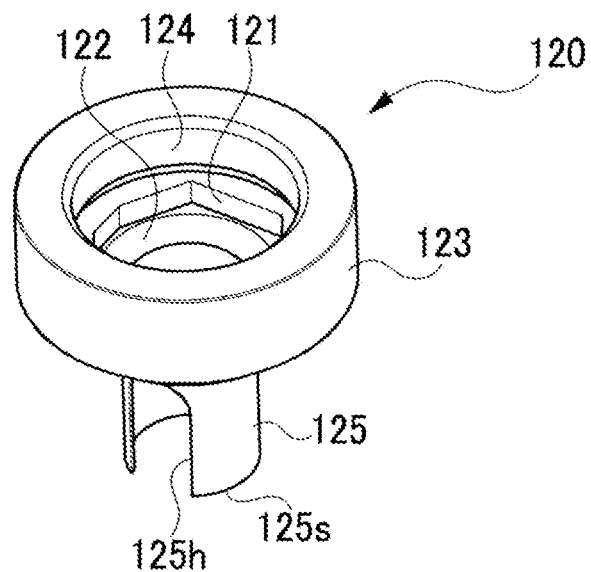
FIG. 13 is a perspective view of a sensor attachment portion according to the embodiment.

As shown in FIGS. 5 and 13, the sensor attachment portion 120 has a cylindrical attachment main body 123 and a cylindrical surrounding portion 125 located on the forward end side GS of the attachment main body 123. The sensor attachment portion 120 is fixed to the exhaust pipe EP by fillet welding (welding all around) between the attachment main body 123 and the exhaust pipe EP in a state in which the surrounding portion 125 is disposed in (inserted into) the exhaust pipe EP through the through hole EPH of the exhaust pipe EP and a lower surface 123b of the attachment main body 123 is in contact with the exhaust pipe EP.

An internal thread 124 is formed on a portion of an inner circumferential surface of the attachment main body 123, which portion is located on the rear end side GK. Further, the seating surface portion 122 tapered such that its diameter decreases toward the forward end side GS is formed on a portion of the inner circumferential surface of the attachment main body 123, which portion is located on the forward end side GS. Further, a pipe-side positioning portion 121 is formed on the inner circumferential surface of the attachment main body 123 to be located on the rear end side GK of the seating surface portion 122. The pipe-side positioning portion 121 has a heptagonal shape in plane view which corresponds to that of the sensor-side positioning portion 11k (see FIGS. 13 and 14).

Figure 14:
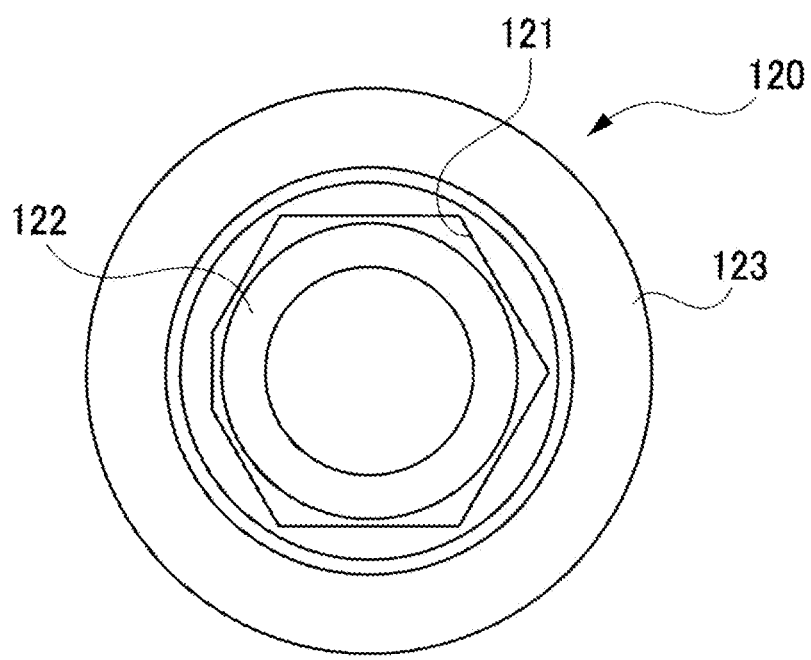
FIG. 14 is a top view (plane view of a rear end portion) of the sensor attachment portion.

As described below, the pipe-side positioning portion 121 allows the circumferential position of the sensor main body 5 to always be set with respect to the sensor attachment portion 120 to a fixed circumferential position when the particulate sensor 1 is attached to the sensor attachment portion 120. As shown in FIG. 14, the pipe-side positioning portion 121 is a recess (hole) having a heptagonal shape in plane view which is approximately the same as that of the sensor-side positioning portion 11k. Notably, as described above, the plane view shape (heptagonal shape) of the sensor-side positioning portion 11k is not rotationally symmetric about the center axis of the first outer metallic member 11 (about the axial line AX of the particulate sensor 1).

Accordingly, there is only one method of combining (mating) the sensor-side positioning portion 11k with the pipe-side positioning portion 121; i.e., there is only one circumferential position (about the axial line AX of the particulate sensor 1) of the sensor-side positioning portion 11k at which the sensor-side positioning portion 11k can be combined (mated) with the pipe-side positioning portion 121. In other words, there is only one direction (position) (about the axial line AX of the particulate sensor 1) of the sensor-side positioning portion 11k at which the sensor-side positioning portion 11k can be combined (mated) with the pipe-side positioning portion 121 shown in FIG. 14. Accordingly, when the particulate sensor 1 is attached to the sensor attachment portion 120 so that the sensor-side positioning portion 11k is combined with the pipe-side positioning portion 121, the pipe-side positioning portion 121 can always set the circumferential position (position about the axial line AX) of the sensor main body 5 with respect to the sensor attachment portion 120 to a fixed circumferential position.

In a state in which the sensor main body 5 of the particulate sensor 1 is attached to the sensor attachment portion 120 fixed to the exhaust pipe EP (state shown in FIG. 5), the surrounding portion 125 surrounds the circumference of a portion of the sensor main body 5, which portion is disposed inside the exhaust pipe EP (hereinafter referred to as the "pipe interior disposition portion 5A"). The surrounding portion 125 has a gas introduction window 125h which is a cutout having a U-like shape in plane view (see FIGS. 5 and 13). The exhaust gas EG is introduced into the radially inner side (interior) of the surrounding portion 125 through the gas introduction window 125h. Notably, the sensor attachment portion 120 is fixed (welded) to the exhaust pipe EP at an orientation determined such that the gas introduction window 125h is open toward the downstream side of the exhaust pipe EP (the left side in FIG. 5).

Also, in the state in which the sensor main body 5 of the particulate sensor 1 is attached to the sensor attachment portion 120 fixed to the exhaust pipe EP (state shown in FIG. 5), the surrounding portion 125 extends in the axial direction GH from the position of the hole-defining portion EPZ of the exhaust pipe EP to a position on the forward end side GS of the position of a gas introduction opening 35h (described below) formed in the pipe interior disposition portion 5A of the sensor main body 5. In other words, in the state in which the sensor main body 5 of the particulate sensor 1 is attached to the sensor attachment portion 120 fixed to the exhaust pipe EP (state shown in FIG. 5), a surrounding forward end portion 125s which is a forwardmost end portion of the surrounding portion 125 in the axial direction GH is located on the forward end side GS in the axial direction GH with respect to the gas introduction opening 35h of the pipe interior disposition portion 5A.

Notably, the pipe interior disposition portion 5A is a portion of the sensor main body 5, which portion is located on the forward end side GS in the axial direction GH (specifically, a portion of the inner metallic member 30). The pipe interior disposition portion 5A has a tubular shape, extends in the axial direction GH, and is disposed inside the exhaust pipe EP when the particulate sensor 1 is attached to the sensor attachment portion 120 fixed to the exhaust pipe EP. The pipe interior disposition portion 5A has a nozzle member 35 which will be described below (specifically, a portion of the nozzle member 35), a mixing and discharging member 37, and a cover member 39.

Figure 17:
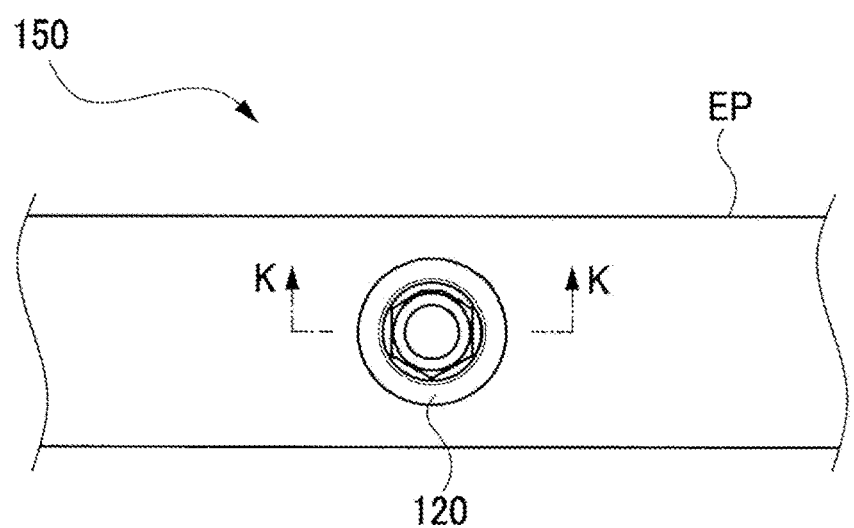
FIG. 17 is a side view of an attachment portion equipped gas flow pipe according to the embodiment.
Figure 18:
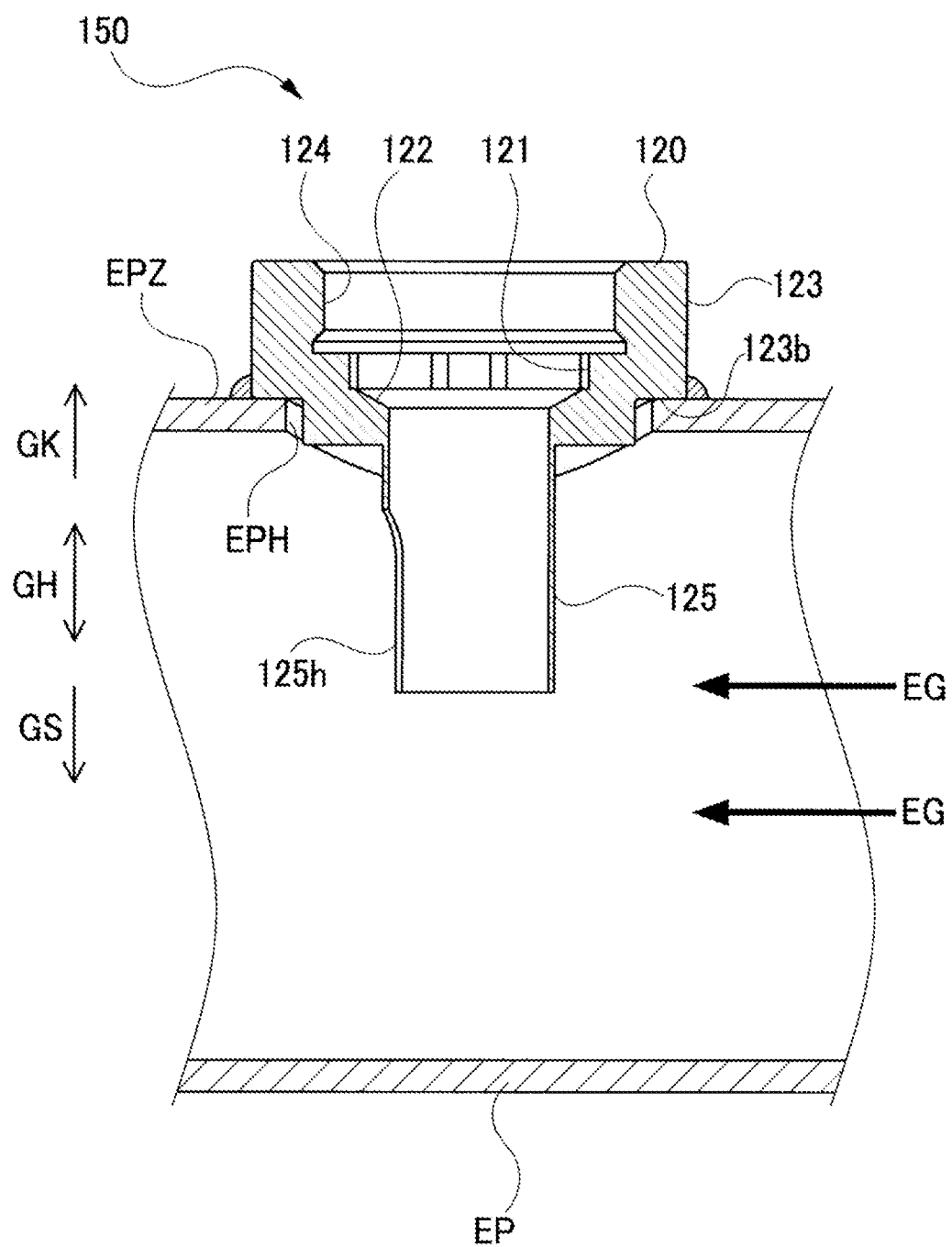
FIG. 18 is a sectional view take along line K-K of FIG. 17.

Next, the attachment portion equipped gas flow pipe 150 of the present embodiment will be described. As shown in FIGS. 17 and 18, the attachment portion equipped gas flow pipe 150 includes the exhaust pipe EP (gas flow pipe) and the sensor attachment portion 120 fixed to the exhaust pipe EP. The sensor attachment portion 120 is fixed (welded) to the exhaust pipe EP at an orientation determined such that the gas introduction window 125h is open toward the downstream side of the exhaust pipe EP (the left side in FIG. 18).

This attachment portion equipped gas flow pipe 150 is manufactured by inserting the surrounding portion 125 of the sensor attachment portion 120 into the exhaust pipe EP through the through hole EPH of the exhaust pipe EP, bringing the lower surface 123b of the attachment main body 123 into contact with the outer circumferential surface of the exhaust pipe EP, and fixing the attachment main body 123 to the exhaust pipe EP by fillet welding (welding of overlapping attachment main body 123 and the exhaust pipe EP at their respective edges). The attachment portion equipped gas flow pipe 150 of the present embodiment constitutes a portion of a flow passage for the exhaust gas EG discharged from the engine ENG (internal combustion engine).

Next, the inner metallic member 30 will be described. The inner metallic member 30 is formed of a metal. As shown in FIGS. 3 and 4, the inner metallic member 30 has a circular columnar outer shape, extends in the axial direction GH, and is disposed on the radially inner side of the outer metallic member 10 such that the inner metallic member 30 is spaced and insulated from the outer metallic member 10. The inner metallic member 30 is connected to the external circuit section 201 through the first reference potential wiring conductor 93 of the first cable 90 and the second reference potential wiring conductor 103 of the second cable 100, whereby the inner metallic member 30 is maintained at a reference potential PV1 different from the ground potential PVE. The inner metallic member 30 is composed of the inner tube 31, the holder 50, the nozzle member 35, the mixing and discharging member 37, and the cover member 39, which are arranged in this order from the rear end side GK toward the forward end side GS (see FIGS. 3, 4, and 6).

The holder 50 has a circular columnar holder main body 51 formed of stainless steel (see FIG. 6). This holder 50 is located on the forward end side GS of the separator 41 in the axial direction GH and is located on the rear end side GK of a discharge space DS in the axial direction GH. The holder 50 is fixed to the inner tube 31 in such a manner that its portion on the rear end side GK is fitted into a forward end portion of the inner tube 31 (see FIG. 4).

The holder main body 51 has a first insertion hole and a second insertion hole which extend through the holder main body 51 in the axial direction GH. The discharge electrode member 70 is inserted into the first insertion hole, and the auxiliary electrode member 80 is inserted into the second insertion hole. Further, the holder main body 51 has an air passage hole 56 which extends through the holder main body 51 in the axial direction GH. The air AR introduced into the interior of the sensor main body 5 through the first air introduction portion 25 flows through the air passage hole 56 from the rear end side GK toward the forward end side GS in the axial direction GH (see FIG. 4).

A portion on the forward end side GS (a forward end portion 55d) of an insertion pipe 55 which will be described below is inserted (press-fitted) into the air passage hole 56 of the holder main body 51 and is fixed thereto (see FIG. 4). The insertion pipe 55 is a cylindrical pipe extending in the axial direction GH and has a hollow space 55b (hollow hole) which extends through the insertion pipe 55 in the axial direction GH. The insertion pipe 55 extends through a first sensor internal space SA1 (a space surrounded by a groove 41f of the separator 41 and an inner circumferential surface of the inner tube 31) in the axial direction GH (see FIG. 4).

A portion on the rear end side GK (a rear end portion 55c) of the insertion pipe 55 is connected to the first air introduction portion 25. Specifically, the rear end portion 55c of the insertion pipe 55 is fixedly inserted (press-fitted) into the air passage hole 22d of the seal member 22. Accordingly, in the present embodiment, the insertion pipe 55 establishes communication between the first air introduction portion 25 and the air passage hole 56 of the holder main body 51. Accordingly, the air AR introduced into the interior of the first air introduction portion 25 passes through the interior (the hollow space 55b) of the insertion pipe 55 and is introduced into the air passage hole 56 of the holder 50. The air AR is then discharged to the outside of the air passage hole 56 through an opening of the air passage hole 56 on the forward end side GS (see FIG. 5).

Also, the holder 50 has an annular inner holding portion 51f which bulges radially outward from its outer circumferential surface and holds the insulating spacer 47 in corporation with the outer holding portion 11b of the outer metallic member 10 (see FIGS. 4 and 6). The inner holding portion 51f is engaged with the insulating spacer 47, over the entire circumference thereof, from the rear end side GK via an annular second intervening member 49, and the insulating spacer 47 is sandwiched and held between the inner holding portion 51f and the outer holding portion 11b of the first outer metallic member 11 (see FIGS. 3 and 4).

The second intervening member 49 is formed of a metal (specifically, stainless steel) and has the shape of a flat annular plate. The second intervening member 49 intervenes between the inner metallic member 30 (specifically, the annular inner holding portion 51f of the holder 50) and the insulating spacer 47 (specifically, a rear end surface 47c of the insulating spacer 47) while being in contact with the inner metallic member 30 and the insulating spacer 47 (being sandwiched therebetween in the axial direction GH). This configuration allows stable insertion of the second intervening member 49 between the inner metallic member 30 and the insulating spacer 47.

The nozzle member 35 is a member having a circular columnar outer shape and is formed of stainless steel. A forward end portion of the holder 50 is fitted into the nozzle member 35 from the rear end side GK and is fixed thereto. The nozzle member 35 is located on the forward end side GS of the holder 50 in the axial direction GH and has a discharge counter electrode portion 35d which serves as a counter electrode for the discharge electrode member 70. The discharge counter electrode portion 35d has a discharge space DS in which a needle-shaped forward end portion 73 which is a forward end portion of the discharge electrode member 70 is disposed. In the discharge space DS, gaseous discharge is generated between the discharge counter electrode portion 35d and the needle-shaped forward end portion 73 of the discharge electrode member 70 (see FIGS. 3 and 9).

Specifically, the discharge counter electrode portion 35d has a nozzle portion 35a and a rear tubular wall portion 35c located on the rear end side GK of the nozzle portion 35a. The nozzle portion 35a has an inner surface tapered such that its diameter decreases from the rear end side GK toward the forward end side GS in the axial direction GH. A communication hole 35f is formed in a forward end portion of the nozzle portion 35a so as to establish communication between the discharge space DS and a cylindrical mixing region MX1 (mixing space) which will be described below. The communication hole 35f has a small diameter and serves as an orifice hole for jetting the air AR from the discharge space DS into the cylindrical mixing region MX1 (mixing space) (see FIGS. 3 and 9).

Further, the nozzle member 35 has a cylindrical forward tubular wall portion 35b located on the forward end side GS of the discharge counter electrode portion 35d in the axial direction GH. The forward tubular wall portion 35b defines a cylindrical mixing space (hereinafter referred to as the "cylindrical mixing region MX1") into which ions CP produced as a result of the gaseous discharge and the exhaust gas EG (gas under measurement) are introduced for mixing. The cylindrical mixing region MX1 (mixing space) communicates with the discharge space DS through the communication hole 35f of the nozzle portion 35a (see FIGS. 3 and 9).

The forward tubular wall portion 35b has a single gas introduction opening 35h which is open toward the downstream side of the exhaust pipe EP and communicates with the cylindrical mixing region MX1 (see FIGS. 3 and 4). The exhaust gas EG (gas under measurement) flowing through the exhaust pipe EP is introduced into the cylindrical mixing region MX1 (mixing space) through the gas introduction window 125h of the surrounding portion 125 of the sensor attachment portion 120 and the gas introduction opening 35h of the forward tubular wall portion 35b.

Figure 15:
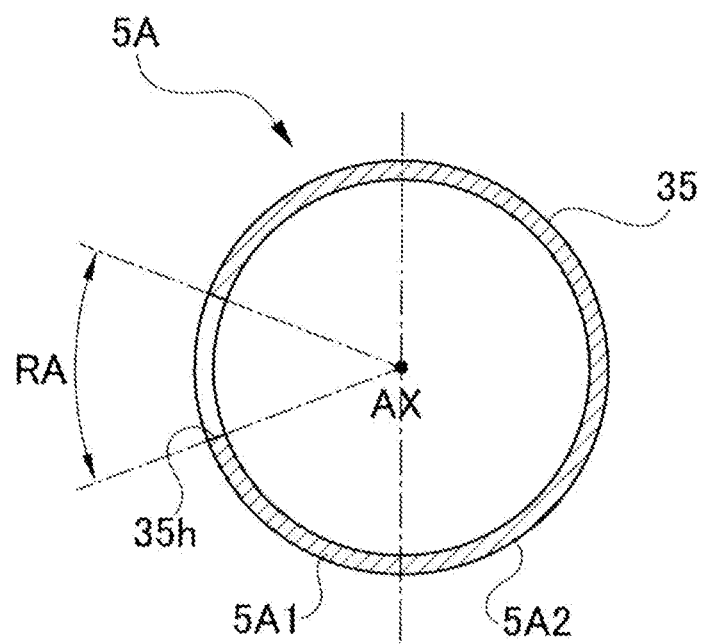
FIG. 15 is a cross sectional view of a nozzle member contained in a pipe interior disposition portion of the particulate sensor, the sectional view being taken along line L-L of FIG. 5.

Notably, as shown in FIG. 15, the gas introduction opening 35h is formed in the pipe interior disposition portion 5A in such a manner that, when the outer circumferential surface of the pipe interior disposition portion 5A is viewed in the circumferential direction (viewed about the axial line AX), a circumferential range RA of the pipe interior disposition portion 5A in which the entire gas introduction opening 35h is contained is equal to or less than half of the entire circumference of the pipe interior disposition portion 5A. In other words, the gas introduction opening 35h is formed in the pipe interior disposition portion 5A such that, when the pipe interior disposition portion 5A is cut, along the axis of the pipe interior disposition portion (which coincides with the axial line AX), into two portions; i.e., a portion 5A1 on one side (a left half in FIG. 15) and a portion 5A2 on the other side (a right half in FIG. 15), the entire gas introduction opening 35h is located in the portion 5A1 on the one side.

If the circumferential position (position around the axial line AX) of the sensor main body 5 with respect to the sensor attachment portion 120 at the time of attachment of the particulate sensor 1 to the sensor attachment portion 120 changes, naturally, the circumferential position (position in the circumferential direction of the sensor main body 5 or the pipe interior disposition portion 5A) of the gas introduction opening 35h within the exhaust pipe EP changes. As a result, the particulate sensor 1 may fail to detect the amount of particulates S contained in the exhaust gas EG appropriately (accurately). Therefore, there is demand for an attachment structure which can always set the circumferential position of the gas introduction opening 35h within the exhaust pipe EP to a fixed circumferential position when the particulate sensor 1 is reattached to the sensor attachment portion 120 after being detached from the sensor attachment portion 120. The attachment structure of the present embodiment will be described in detail below.

The mixing and discharging member 37 is a member having a circular columnar outer shape and formed of stainless steel. The mixing and discharging member 37 is fitted into a forward end portion of the nozzle member 35 from the forward end side GS and is fixed thereto. The mixing and discharging member 37 has a discharge rear end portion 37a located on the rear end side GK and a cylindrical tubular wall portion 37b which extends toward the forward end side GS from the peripheral edge of the discharge rear end portion 37a. A trapping electrode 37c bulging radially inward is provided on the discharge rear end portion 37a. A slit-shaped mixing region MX2 which is a slit-shaped space is formed by the trapping electrode 37c. This slit-shaped mixing region MX2 communicates with the above-described cylindrical mixing region MX1 (see FIG. 4).

Meanwhile, a gas exhaust passage EX which is a circular columnar space is formed in the tubular wall portion 37b. This gas exhaust passage EX communicates with the slit-shaped mixing region MX2. Also, the tubular wall portion 37b has a single gas discharge opening 37h which is open toward the downstream side of the exhaust pipe EP and communicates with the gas exhaust passage EX (see FIGS. 3 and 4). The gas discharge opening 37h is located on the forward end side GS of the cylindrical mixing region MX1 (mixing space) in the axial direction GH, and discharges the exhaust gas EG introduced into the cylindrical mixing region MX1 to the outside of the sensor main body 5.

The cover member 39 is a disk-shaped member formed of stainless steel and closes an opening of the mixing and discharging member 37 on the forward end side GS.

The inner tube 31 is a cylindrical tubular member extending in the axial direction GH and formed of stainless steel (see FIGS. 3, 4, and 6). The inner tube 31 is composed of a semi-cylindrical first member 32 and a semi-cylindrical second member 34, and formed by combining the first member 32 and the second member 34. The first member 32 and the second member 34 have the same shape. Specifically, the first member 32 and the second member 34 have the shape of a half tube obtained by bisecting the inner tube 31 along the axial direction GH.

The first member 32 has a semi-cylindrical separator covering portion 32b and a semi-circular columnar contact conduction portion 32c located on the rear end side GK of the separator covering portion 32b. The contact conduction portion 32c has a circular air passage hole penetrating the contact conduction portion 32c in the axial direction GH. Notably, the second member 34 has a shape similar to that of the first member 32.

The electrically insulating separator 41 is accommodated in the inner tube 31 formed by combining the above-descried first and second members 32 and 34 (see FIGS. 3 and 4). Specifically, the separator 41 is accommodated in a cylindrical space (cylindrical separator accommodation space) defined by the separator covering portion 32b of the first member 32 and the separator covering portion 34b of the second member 34 such that the separator 41 comes into contact with the separator covering portion 32b and the separator covering portion 34b. As a result, the separator 41 is held by the inner tube 31.

Figure 11:
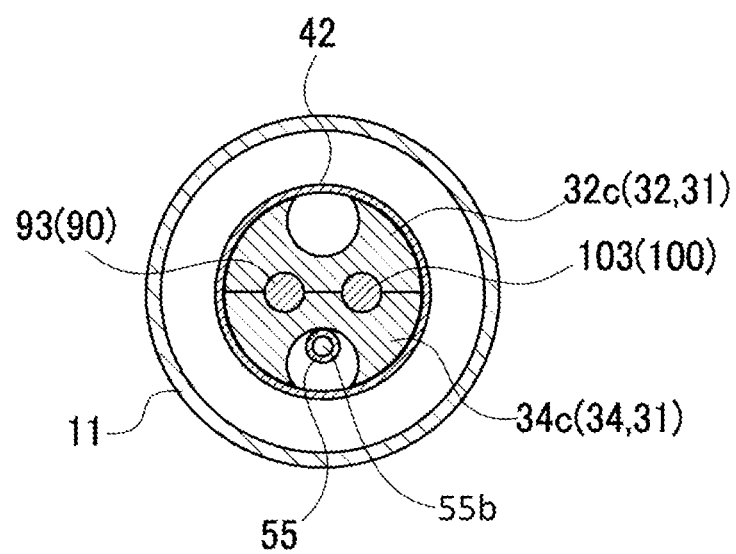
FIG. 11 is a cross sectional view of the particulate sensor taken along line F-F of FIG. 3.

The first reference potential wiring conductor 93 and the second reference potential wiring conductor 103 are respectively disposed in two cylindrical spaces which are defined by two cylindrical contact surfaces formed by the contact conduction portion 32c of the first member 32 and the contact conduction portion 34c of the second member 34 such that the first reference potential wiring conductor 93 and the second reference potential wiring conductor 103 come into contact with the two cylindrical contact surfaces (see FIG. 11). As a result, the inner tube 31 comes into contact with the first reference potential wiring conductor 93 and the second reference potential wiring conductor 103 and electrically communicates with these conductors.

The inner tube 31 is fixed inside the sensor main body 5. Specially, a forward end portion of the inner tube 31 is fitted onto a rear end portion of the holder 50, and the inner tube 31 and the holder 50 are welded together in the fitting on region (the forward end portion of the inner tube 31 and the rear end portion of the holder 50 are welded together), whereby the forward end portion of the inner tube 31 is fixed inside the sensor main body 5.

Also, a rear end portion of the inner tube 31 is fixedly inserted into a cylindrical metallic holding member 42 and is held by the metallic holding member 42 in such a state. As a result, the state in which the first member 32 and the second member 34 have been combined to constitute the cylindrical inner tube 31 can be maintained, and the rear end portion of the inner tube 31 is fixed inside the sensor main body 5. Notably, the rear end portion of the inner tube 31 and the metallic holding member 42 are fixed to each other by means of welding.

The metallic holding member 42 has a cylindrical side wall portion 42b extending in the axial direction GH and an annular bottom portion 42c connected to the rear end of the side wall portion 42b (see FIGS. 4 and 6). A circular through hole 42d is provided in the bottom portion 42c. The insertion pipe 55 extends through the through hole 42d in the axial direction GH (see FIG. 4). Further, the insertion pipe 55 extends in the axial direction GH through a space defined between the contact conduction portion 34c of the second member 34 and the metallic holding member 42 (See FIG. 11).

A rear end portion of the metallic holding member 42 is disposed in a cylindrical insulating member 43 constituted by combining two semi-cylindrical insulating members 43b and 43c and is held by the insulating member 43. Further, an annular rubber member 44 is disposed on the rear end side GK of the insulating member 43, and a C-shaped washer 45 is disposed on the rear end side GK of the rubber member 44 (see FIGS. 4 and 6).

Figure 12:
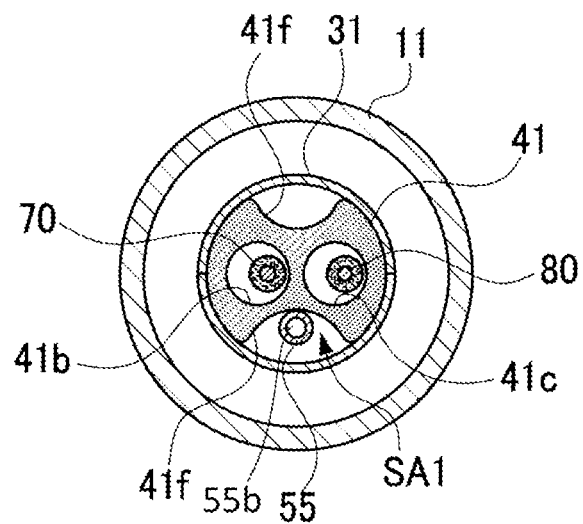
FIG. 12 is a cross sectional view of the particulate sensor taken along line G-G of FIG. 3.

The separator 41 is formed of an electrically insulating member (ceramic containing alumina as a main component), has a columnar shape, and extends in the axial direction GH (see FIGS. 3, 4, and 6). The separator 41 has a first through hole 41b and a second through hole 41c which extend through the separator 41 in the axial direction GH (see FIG. 12). The first through hole 41b and the second through hole 41c are separate through holes and are spaced from each other in a direction (in the left-right direction in FIGS. 3 and 12) orthogonal to the axial direction GH, with a wall portion of the separator 41 intervening therebetween.

A forward end portion of the first cable 90 and the first extension portion 71 of the discharge electrode member 70 are inserted into the first through hole 41b of the separator 41. The discharge potential connection portion 111 is disposed in the first through hole 41b. The discharge potential connection portion 111 is the connection portion where the forward end 91b of the discharge potential wiring conductor 91 and the rear end portion of the first extension portion 71 of the discharge electrode member 70 are connected through the first connection terminal 77. Notably, the discharge potential wiring conductor 91, the discharge electrode member 70, and the first connection terminal 77 which constitute the discharge potential connection portion 111 correspond to the discharge potential member.

A forward end portion of the second cable 100 and the second extension portion 81 of the auxiliary electrode member 80 are inserted into the second through hole 41c of the separator 41. The auxiliary potential connection portion 112 is disposed in the second through hole 41c. The auxiliary potential connection portion 112 is the portion where the forward end 101b of the auxiliary potential wiring conductor 101 and the rear end portion of the second extension portion 81 of the auxiliary electrode member 80 are connected through the second connection terminal 87.

As a result, the discharge potential connection portion 111 which will have a discharge potential PV2 and the auxiliary potential connection portion 112 which will have an auxiliary potential PV4 are electrically insulated from each other by the separator 41. Further, the discharge potential connection portion 111 which will have the discharge potential PV2 and the inner metallic member 30 (the inner tube 31, etc.) which will have the reference potential PV1 are electrically insulated from each other by the separator 41. Further, the auxiliary potential connection portion 112 which will have the auxiliary potential PV4 and the inner metallic member 30 (the inner tube 31, etc.) which will have the reference potential PV1 are electrically insulated from each other by the separator 41.

Next, the discharge electrode member 70 will be described. The discharge electrode member 70 has a discharge electrode main body 70A formed of tungsten wire and a first insulating pipe 75 located around the discharge electrode main body 70A. As shown in FIG. 3, the discharge electrode main body 70A has the first extension portion 71 having the shape of a straight rod and a needle-shaped forward end portion 73 located at the forward end of the first extension portion 71 and being sharpened like a needle. The discharge electrode main body 70A (the needle-shaped forward end portion 73) is connected to the external circuit section 201 through the discharge potential wiring conductor 91 of the first cable 90, whereby the discharge electrode main body 70A is maintained at the discharge potential PV2. Notably, the discharge potential PV2 is a positive high potential with respect to the reference potential PV1 and its peak potential is 1 to 2 kV.

The circumference of the first extension portion 71 is covered by a cylindrical first insulating pipe 75 formed of insulating ceramic. However, a rear end portion of the first extension portion 71 is exposed without being covered by the first insulating pipe 75. This allows the rear end portion of the first extension portion 71 to be connected to the forward end portion 91b of the discharge potential wiring conductor 91 through the first connection terminal 77.

Meanwhile, the needle-shaped forward end portion 73 is disposed in the discharge space DS defined by the discharge counter electrode portion 35d and constitutes an ion source in corporation with the discharge counter electrode portion 35d. Namely, as described below, the discharge counter electrode portion 35d maintained at the reference potential PV1 and the needle-shaped forward end portion 73 maintained at the discharge potential PV2 generate a gaseous discharge therebetween. As a result of this gaseous discharge, ions CP which are caused to adhere to the particulate S are produced.

Next, the auxiliary electrode member 80 will be described. The auxiliary electrode member 80 has an auxiliary electrode main body 80A formed of stainless steel wire and a cylindrical second insulating pipe 85 located around the auxiliary electrode main body 80A. As shown in FIG. 3, the auxiliary electrode main body 80A has a second extension portion 81 having the shape of a straight rod, a turnback portion 82 located on the forward end side GS of the second extension portion 81 and having a U-like shape, and an auxiliary electrode portion 83 extending from the turnback portion 82 toward the rear end side GK and having an end sharpened like a needle.

The circumference of the second extension portion 81 is covered by a cylindrical second insulating pipe 85 formed of insulating ceramic. However, a rear end portion of the second extension portion 81 is exposed without being covered by the second insulating pipe 85. This allows the rear end portion of the second extension portion 81 to be connected to the forward end portion 101b of the auxiliary potential wiring conductor 101 through the second connection terminal 87. The turnback portion 82 is disposed in the gas exhaust passage EX.

Meanwhile, the auxiliary electrode portion 83 is disposed in the slit-shaped mixing region MX2. The auxiliary electrode member 80 (the auxiliary electrode portion 83) is connected to the external circuit section 201 through the auxiliary potential wiring conductor 101 of the second cable 100, whereby the auxiliary electrode member 80 is maintained at the auxiliary potential PV4. The auxiliary potential PV4 is a positive high potential with respect to the reference potential PV1 but is lower than the peak potential (1 to 2 kV) of the discharge potential PV2. For example, the auxiliary potential PV4 is set to DC 100 to 200 V.

Notably, as described below, the particulate sensor 1 of the present embodiment produces the ions CP by generating a gaseous discharge and causes the ions CP to adhere to the particulates S contained in the exhaust gas EG, thereby producing electrified particulates SC. More specifically, in the discharge space DS, a gaseous discharge is generated between the needle-shaped forward end portion 73 of the discharge electrode member 70 and the discharge counter electrode portion 35d. In the cylindrical mixing region MX1 (mixing area), the ions CP produced as a result of the gaseous discharge are caused to adhere to the particulates S contained in the exhaust gas EG, whereby the electrified particulates SC are produced. The amount of the particulates S contained in the exhaust gas EG is detected using a signal current which flows between the reference potential PV1 and the ground potential PVE in accordance with the amount of the electrified particulates SC.

The particulate sensor 1 (the sensor main body 5) of the present embodiment has a first sensor internal air flow passage FC1 which allows the air AR introduced into the interior of the sensor main body 5 through the first air introduction portion 25 to flow from the rear end side GK toward the forward end side GS in the axial direction GH within the sensor main body 5 (see FIGS. 4 and 8). More specifically, the first sensor internal air flow passage FC1 is a flow passage configured such that the air AR introduced into the first air introduction portion 25 flows from the rear end side GK toward the forward end side GS in the axial direction GH within the insertion pipe 55 to thereby establish communication between the first air introduction portion 25 and the air passage hole 56 of the holder 50. The air AR then passes through the air passage hole 56 of the holder 50 and is introduced into the discharge space DS, and the air AR is then introduced from the discharge space DS into the cylindrical mixing region MX1 (mixing space) through the communication hole 35f of the nozzle portion 35a (see FIG. 4). Notably, when the air AR is then introduced from the discharge space DS into the cylindrical mixing region MX1 (mixing space) through the communication hole 35f of the nozzle portion 35a, the ions CP produced in the discharge space DS are introduced into the cylindrical mixing region MX1 (mixing space) together with the air AR (see FIGS. 4, 8, and 9).

Also, the particulate sensor 1 (the sensor main body 5) of the present embodiment has a second sensor internal air flow passage FC2 which allows the air AR introduced into the interior of the sensor main body 5 through the second air introduction portion 27 to flow from the rear end side GK toward the forward end side GS in the axial direction GH within the sensor main body 5 and then flow from the rear end side GK toward the forward end side GS in the axial direction GH within the second sensor internal space SA2 between the inner circumferential surface 11n of the outer metallic member 10 (the first outer metallic member 11) and the outer circumferential surface 30n of the inner metallic member 30 (see FIG. 4). The second sensor internal air flow passage FC2 is located adjacent to the gas-under-measurement entering space IS on the forward end side GS in the axial direction GH, with the first intervening member 48 and the second intervening member 49 intervening therebetween (see FIG. 4). In other words, the first intervening member 48 and the second intervening member 49 are disposed at the boundary between the sensor internal air flow passage (specifically, the second sensor internal air flow passage FC2) and the gas-under-measurement entering space IS.

Incidentally, the particulates S (soot, etc.) contained in the exhaust gas EG (gas under measurement) also enter the gas-under-measurement entering space IS. Therefore, a conventional particulate sensor has the following problem. In the gas-under-measurement entering space (in particular, in a region where the exhaust gas EG is likely to stagnate), the particulates S (soot, etc.) contained in the exhaust gas EG may adhere to and accumulate on the outer circumferential surface 30n of the inner metallic member 30 and the inner circumferential surface 11n of the first outer metallic member 11 which define the gas-under-measurement entering space IS. As a result, the electrical insulation between the inner metallic member 30 maintained at the reference potential PV1 and the outer metallic member 10 maintained at the ground potential PVE deteriorates (for example, a micro short circuit is formed through the accumulated particulates S such as soot). In such a case, the conventional particulate sensor may fail to accurately detect the amount of the particulates S contained in the exhaust gas EG.

Figure 19:
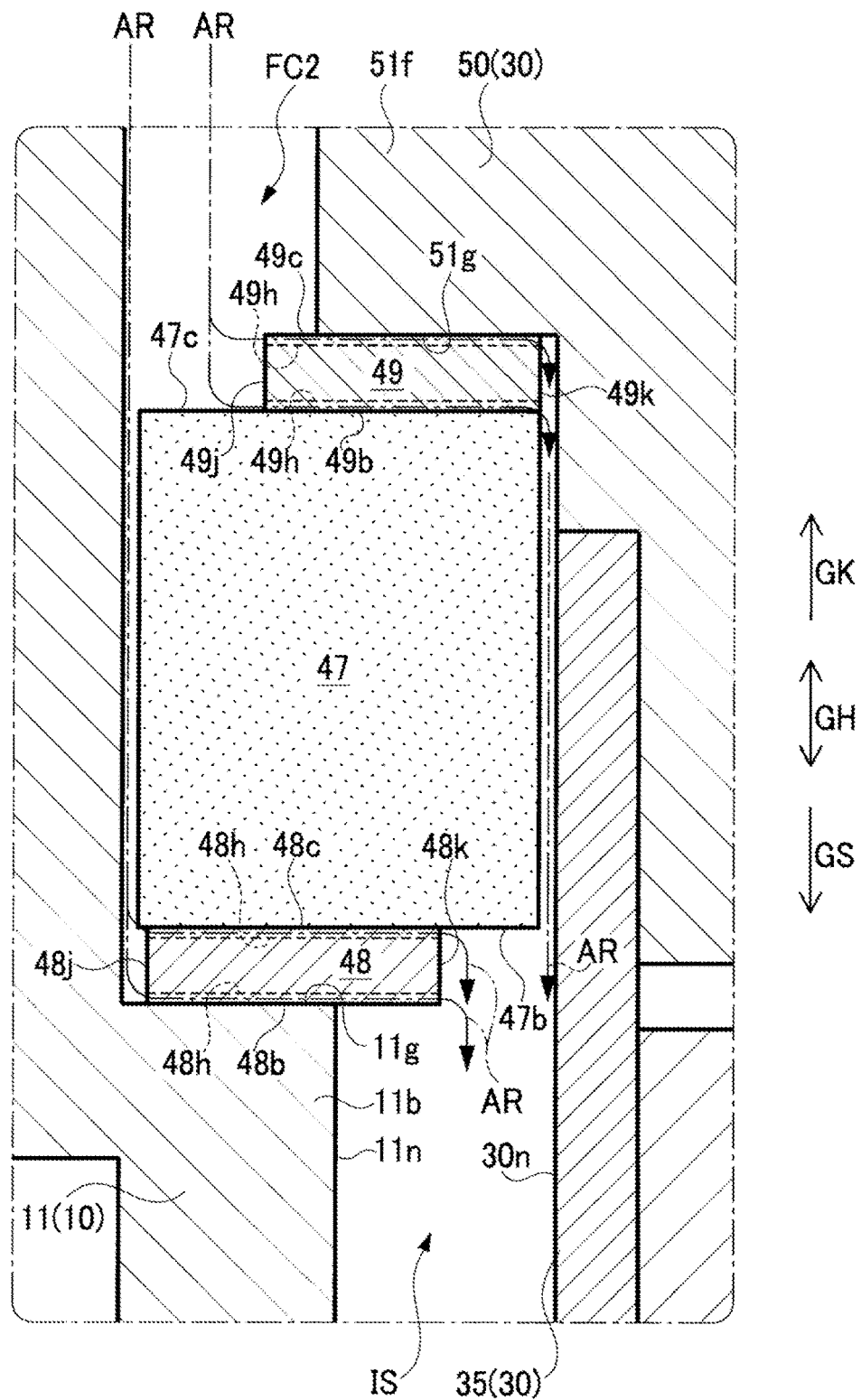
FIG. 19 is an enlarged view of a region B of FIG. 4.

In order to solve such a problem, in the particulate sensor 1 of the present embodiment, the first intervening member 48 has a plurality of grooves 48h (recesses) for causing the air AR flowing through the second sensor internal air flow passage FC2 to flow from the second sensor internal air flow passage FC2 into the gas-under-measurement entering space IS (i.e., discharging the air AR to the gas-under-measurement entering space IS) as shown in FIG. 19. The grooves 48h are formed on an annular first surface 48b of the first intervening member 48 which is in contact with (faces) the outer metallic member 10 (the outer holding portion 11b of the first outer metallic member 11) and on an annular second surface 48c of the first intervening member 48 which is in contact with (faces) a forward end surface 47b of the insulating spacer 47.

The grooves 48h of the first intervening member 48 extend from the second sensor internal air flow passage FC2 (the outer circumference 48j of the first intervening member 48) to the gas-under-measurement entering space IS (the inner circumference 48k of the first intervening member 48). More specifically, the grooves 48h of the first intervening member 48 extend from the outer circumference 48j of the first intervening member 48 to the inner circumference 48k thereof, thereby establishing communication between the second sensor internal air flow passage FC2 and the gas-under-measurement entering space IS (see FIG. 19).

Further, the second intervening member 49 has a plurality of grooves 49h (recesses) for causing the air AR flowing through the second sensor internal air flow passage FC2 to flow from the second sensor internal air flow passage FC2 into the gas-under-measurement entering space IS (i.e., discharging the air AR to the gas-under-measurement entering space IS) (see FIG. 19). The grooves 49h are formed on an annular third surface 49c of the second intervening member 49 which is in contact with (faces) the inner metallic member 30 (the inner holding portion 51f of the holder 50) and on an annular fourth surface 49b of the second intervening member 49 which is in contact with (faces) a rear end surface 47c of the insulating spacer 47.

The grooves 49h of the second intervening member 49 extend from the second sensor internal air flow passage FC2 (the outer circumference 49j of the second intervening member 49) to the gas-under-measurement entering space IS (the inner circumference 49k of the second intervening member 49). More specifically, the grooves 49h of the second intervening member 49 extend from the outer circumference 49j of the second intervening member 49 to the inner circumference 49k thereof, thereby establishing communication between the second sensor internal air flow passage FC2 and the gas-under-measurement entering space IS (see FIG. 19).

As a result, the air AR can be caused to flow from the second sensor internal air flow passage FC2 to the gas-under-measurement entering space IS (can be discharged from the second sensor internal air flow passage FC2 to the gas-under-measurement entering space IS) through the grooves 48h of the first intervening member 48 (specifically, communication passages (spaces) surrounded by portions of the first surface 48b of the first intervening member 48 which define the grooves 48h and a fifth surface 11g of the outer metallic member 10). Further, the air AR can be caused to flow from the second sensor internal air flow passage FC2 to the gas-under-measurement entering space IS (can be discharged from the second sensor internal air flow passage FC2 to the gas-under-measurement entering space IS) through the grooves 49h of the second intervening member 49 (specifically, communication passages (spaces) surrounded by portions of the third surface 49c of the second intervening member 49 which define the grooves 49h and a sixth surface 51g of the inner metallic member 30).

Since the above-described configuration generates a flow of the air AR in the gas-under-measurement entering space IS, the exhaust gas EG (gas under measurement) becomes less likely to stagnate in the gas-under-measurement entering the space IS. As a result, the particulates S (for example, soot or the like) contained in the exhaust gas EG (gas under measurement) become less likely to adhere to (accumulate on) the outer circumferential surface 30n of the inner metallic member 30 and the inner circumferential surface 11n of the outer metallic member 10 which define the gas-under-measurement entering space IS. For example, the particulates S which are about to adhere to the outer circumferential surface 30n of the inner metallic member 30 and the inner circumferential surface 11n of the outer metallic member 10 can be blown away by the air AR. Accordingly, in the particulate sensor 1 of the present embodiment, the electrical insulation between the inner metallic member 30 maintained at the reference potential PV1 and the outer metallic member 10 maintained at the ground potential PVE is less likely to deteriorate in the gas-under-measurement entering space IS.

Next, an attachment structure and a method of attaching the particulate sensor 1 (the sensor main body 5) to the sensor attachment portion 120 fixed to the exhaust pipe EP (namely, the sensor attachment portion 120 of the attachment portion equipped gas flow pipe 150) will be described. When the particulate sensor 1 (the sensor main body 5) is attached to the sensor attachment portion 120 fixed to the exhaust pipe EP, a portion of the sensor main body 5 on the forward end side GS in the axial direction GH is inserted into the space inside the sensor attachment portion 120, and the sensor-side positioning portion 11k of the sensor main body 5 (the first outer metallic member 11) is inserted into (is mated with) the pipe-side positioning portion 121 of the sensor attachment portion 120. Subsequently, the seal portion 11m of the sensor main body 5 (the first outer metallic member 11) is brought into contact with the seating surface portion 122 of the sensor attachment portion 120.

Incidentally, as described above, the sensor-side positioning portion 11k of the sensor main body 5 is a protrusion having a shape which is not rotationally symmetric about the axial line AX of the particulate sensor 1. Namely, when the sensor-side positioning portion 11k is rotated one turn (rotated 360°) about the center axis of the first outer metallic member 11 (about the axial line AX of the particulate sensor 1), in the middle of the rotation, the sensor-side positioning portion 11k does not have the same plane view shape as the plane view shape before being rotated (see FIG. 10). Further, the pipe-side positioning portion 121 of the sensor attachment portion 120 is a concave portion (hole portion) having a shape (heptagonal shape in plane view) which is approximately the same as that of the sensor-side positioning portion 11k (see FIG. 14).

Accordingly, there is only one method of combining (mating) the sensor-side positioning portion 11k with the pipe-side positioning portion 121; i.e., there is only one circumferential position (about the axial line AX of the particulate sensor 1) of the sensor-side positioning portion 11k at which the sensor-side positioning portion 11k can be combined (mated) with the pipe-side positioning portion 121. In other words, there is only one direction (position) (about the axial line AX of the particulate sensor 1) of the sensor-side positioning portion 11k at which the sensor-side positioning portion 11k can be combined (mated) with the pipe-side positioning portion 121.

Accordingly, in the present embodiment, when the particulate sensor 1 is attached to the sensor attachment portion 120 such that the sensor-side positioning portion 11k is combined (mated) with the pipe-side positioning portion 121 as described above, the circumferential position (position about the axial line AX) of the sensor main body 5 with respect to the sensor attachment portion 120 can always be set to a fixed circumferential position (the position shown in FIG. 5).

Figure 16:
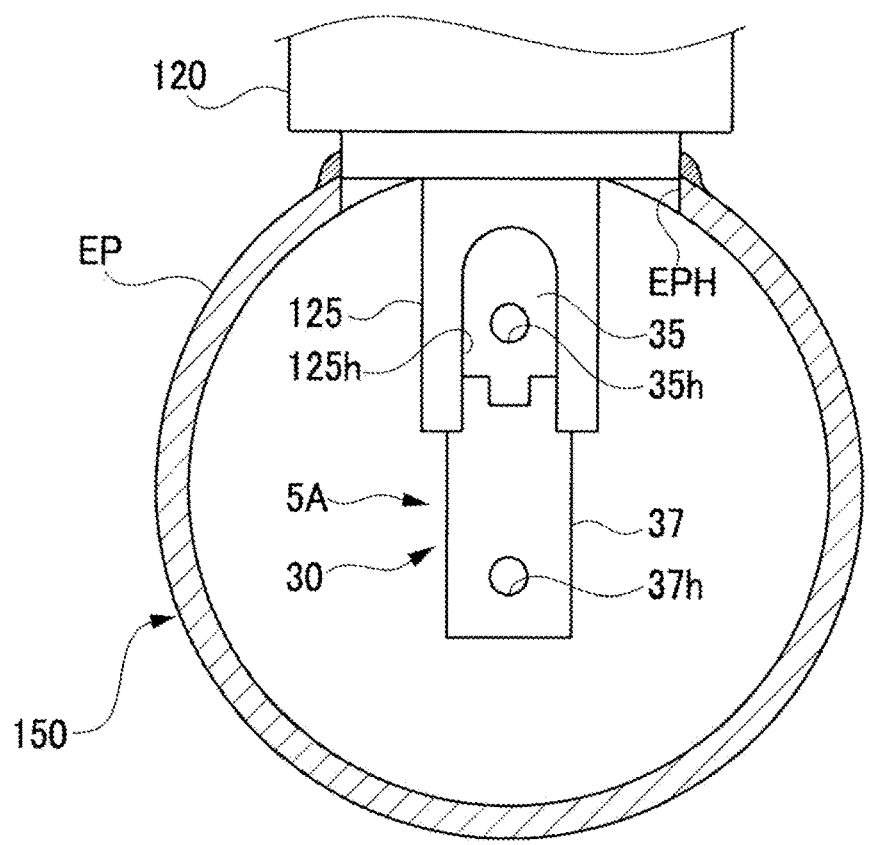
FIG. 16 is an enlarged partial sectional view of the particulate sensor attached to the exhaust pipe.

As a result, the circumferential position of the gas introduction opening 35h within the exhaust pipe EP can always be set to the fixed first circumferential position (the position shown in FIGS. 5 and 16 and at which the gas introduction opening 35h is open toward the downstream side of the exhaust pipe EP). Notably, FIG. 16 is an enlarged partial sectional view of the particulate sensor 1 attached to the sensor attachment portion 120 of the attachment portion equipped gas flow pipe 150, as viewed from the downstream side toward the upstream side of the exhaust pipe EP.

Namely, when the particulate sensor 1 is attached to the sensor attachment portion 120 of the attachment portion equipped gas flow pipe 150 while the circumferential position of the sensor main body 5 with respect to the sensor attachment portion 120 is determined by the sensor-side positioning portion 11k, the circumferential position of the gas introduction opening 35h within the exhaust pipe EP can always be set to the fixed first circumferential position (see FIGS. 5 and 16). In other words, when the particulate sensor 1 is attached to the sensor attachment portion 120 of the attachment portion equipped gas flow pipe 150 while the circumferential position of the sensor main body 5 with respect to the sensor attachment portion 120 is determined by the pipe-side positioning portion 121, the circumferential position of the gas introduction opening 35h within the exhaust pipe EP can always be set to the fixed first circumferential position (see FIGS. 5 and 16).

In this state, the external thread portion 61 of the fastening member 60 is brought into screw engagement with the internal thread 124 of the attachment main body 123, and the sensor main body 5 and the sensor attachment portion 120 are connected together by the fastening member 60. As a result, the flange portion 11c of the first outer metallic member 11 is pushed toward the forward end side GS by the forward end portion of the fastening member 60, whereby the seal portion 11m of the sensor main body 5 comes into close contact with the seating surface portion 122 of the sensor attachment portion 120. As a result, the sensor main body 5 of the particulate sensor 1 is detachably attached (fixed) to the sensor attachment portion 120 fixed to the exhaust pipe EP in a state in which gastight sealing is established between the sensor main body 5 (the first outer metallic member 11) and the sensor attachment portion 120. Notably, since the fastening member 60 is disposed to be rotatable with respect to the sensor main body 5, the sensor main body 5 can be attached to the sensor attachment portion 120 by rotating the fastening member 60 only without rotating the sensor main body 5.

As described above, in the present embodiment, in the case where the particulate sensor 1 is detached from the sensor attachment portion 120 and is again attached to the sensor attachment portion 120, the circumferential position of the gas introduction opening 35h within the exhaust pipe EP (gas flow pipe) can always be set to the fixed first circumferential position. Therefore, in the case where the particulate sensor 1 is regularly detached from the sensor attachment portion 120 for the purpose of, for example, regular cleaning of the particulate sensor 1 as described below, when the particulate sensor 1 is attached to the sensor attachment portion 120 after the cleaning, the circumferential position of the gas introduction opening 35h within the exhaust pipe EP (gas flow pipe) can always be set to the fixed first circumferential position.

Specifically, in the present embodiment, as described above, the sensor attachment portion 120 having the surrounding portion 125 is maintained at the ground potential PVE as a result of the sensor attachment portion 120 being fixed to the exhaust pipe EP maintained at the ground potential PVE. Meanwhile, of the sensor main body 5, the pipe interior disposition portion 5A (a portion of the inner metallic member 30) having the gas introduction opening 35h is electrically insulated from the sensor attachment portion 120 and is maintained at the reference potential PV1 different from the ground potential PVE.

Incidentally, the particulates S (soot or the like) contained in the exhaust gas EG may adhere to the outer circumferential surface of the pipe interior disposition portion 5A which is a portion of the sensor main body 5 and has the gas introduction opening 35h. As a result, the electrical insulation between the pipe interior disposition portion 5A maintained at the reference potential PV1 and the surrounding portion 125 which is a portion of the sensor attachment portion 120 maintained at the ground potential PVE and surrounds the circumference of the pipe interior disposition portion 5A may deteriorate. In such a case, the conventional particulate sensor may fail to accurately detect the amount of the particulates S contained in the exhaust gas EG.

Also, in the particulate sensor 1 of the present embodiment, the sensor main body 5 includes the insulating spacer 47 which is interposed between the inner metallic member 30 maintained at the reference potential PV1 and the outer metallic member 10 maintained at the ground potential PVE so as to electrically insulate these metallic members from each other. Since the insulating spacer 47 is exposed to the gas-under-measurement entering space IS, in a state in which the particulate sensor 1 is attached to the sensor attachment portion 120 as shown in FIG. 5, the insulating spacer 47 is disposed at a position where the exhaust gas EG flowing through the exhaust pipe EP can come into contact with the insulating spacer 47.

Therefore, the particulates S (soot or the like) contained in the exhaust gas EG may adhere to the surface of the insulating spacer 47. As a result, the insulation resistance of the surface of the insulating spacer 47 decreases, and the electrical insulation between the inner metallic member 30 maintained at the reference potential PV1 and the outer metallic member 10 maintained at the ground potential PVE may deteriorate. In such a case, the particulate sensor may fail to accurately detect the amount of the particulates S contained in the exhaust gas EG.

For the above-described reason, regular cleaning of the particulate sensor 1 is preferred. Therefore, the particulate sensor 1 may be regularly detached from the sensor attachment portion 120 so as to clean the particulate sensor 1. In the present embodiment, when the particulate sensor 1 is attached to the sensor attachment portion 120 after the cleaning, the circumferential position of the gas introduction opening 35h within the exhaust pipe EP (gas flow pipe) can always be set to the fixed first circumferential position.

Accordingly, the particulate sensor 1 of the present embodiment can prevent the occurrence of a "malfunction of failure to appropriately (accurately) detect the amount of particulates S contained in the exhaust gas EG (gas under measurement), which malfunction would otherwise occur in the case where, when the particulate sensor 1 is detached from the sensor attachment portion 120 and is again attached to the attachment portion 120, the circumferential position of the gas introduction opening 35h within the exhaust pipe EP (gas flow pipe) changes from the original position before the detachment of the particulate sensor 1."

Incidentally, water may accumulate inside the exhaust pipe EP. Specifically, since the exhaust pipe EP is cooled after operation of the engine ENG (internal combustion engine), condensed water accumulates inside the exhaust pipe EP in some cases. Therefore, conventionally, there has been a possibility that, when the water remaining inside the exhaust pipe EP sprays from the upstream side of the exhaust pipe EP toward the pipe interior disposition portion of the particulate sensor due to the flow of the exhaust gas flowing within the exhaust pipe EP from the upstream side toward the downstream side, the water may enter the interior of the particulate sensor (the sensor main body) through the gas introduction opening. Specifically, for example, in the case where the gas introduction opening is open toward the downstream side of the exhaust pipe EP, the water spraying from the upstream side of the exhaust pipe EP does not directly enter the gas introduction opening. However, the water having adhered to a part of the outer circumferential surface of the pipe interior disposition portion, which part is located on the upstream side, may move toward the downstream side on the outer circumferential surface of the pipe interior disposition portion due to the flow of the exhaust gas and enter the gas introduction opening. As a result, the particulate sensor may become unable to appropriately detect the amount of the particulates S contained in the exhaust gas EG (gas under measurement).

In contrast, in the present embodiment, as described above, the sensor attachment portion 120 has the surrounding portion 125 which surrounds the circumference of the pipe interior disposition portion 5A which is a portion of the sensor main body 5 and is disposed inside the exhaust pipe EP (surrounds the circumference of the pipe interior disposition portion 5A while being spaced from the pipe interior disposition portion 5A) in a state in which the sensor main body 5 of the particulate sensor 1 is attached to the sensor attachment portion 120 fixed to the exhaust pipe EP (the state shown in FIG. 5).

Further, in the state in which the sensor main body 5 of the particulate sensor 1 is attached to the sensor attachment portion 120 fixed to the exhaust pipe EP (state shown in FIG. 5), the surrounding portion 125 extends in the axial direction GH from the position of the hole-defining portion EPZ of the exhaust pipe EP to a position on the pipe interior disposition portion 5A of the sensor main body 5, which position is located on the forward end side GS of the position of the gas introduction opening 35*h* which will be described below. In other words, in the state in which the sensor main body 5 of the particulate sensor 1 is attached to the sensor attachment portion 120 fixed to the exhaust pipe EP (state shown in FIG. 5), the surrounding forward end portion 125*s* of the surrounding portion 125 which is located furthest toward the forward end side GS in the axial direction GH is located on the forward end side GS (in the axial direction GH) of the gas introduction opening 35*h* of the pipe interior disposition portion 5A.

In the present embodiment, since such a surrounding portion 125 is provided, in the case where the water remaining in the exhaust pipe EP sprays from the upstream side of the exhaust pipe EP toward the pipe interior disposition portion 5A of the particulate sensor 1 due to the flow of the exhaust gas EG (gas under measurement) flowing within the exhaust pipe EP from the upstream side toward the downstream side (from the right-hand side toward the left-hand side in FIG. 5), the water is less likely to enter the interior of the particulate sensor 1 (the sensor main body 5) through the gas introduction opening 35*h*. Specifically, since the water spraying from the upstream side of the exhaust pipe EP (the right-hand side in FIG. 5) toward the pipe interior disposition portion 5A of the particulate sensor 1 is received by the surrounding portion 125, the water is less likely to enter the interior of the particulate sensor 1 (the sensor main body 5) through the gas introduction opening 35*h*.

Also, in the present embodiment, when the particulate sensor 1 is attached to the sensor attachment portion 120 fixed to the exhaust pipe EP, the gas introduction opening 35*h* positioned at the first circumferential position is open toward the downstream side of the exhaust pipe EP (the left-hand side in FIG. 5).

Further, the surrounding portion 125 of the sensor attachment portion 120 has the gas introduction window 125*h* which is open toward the downstream side of the exhaust pipe EP in a state in which the sensor attachment portion 120 is fixed to the exhaust pipe EP. The gas introduction window 125*h* has a shape determined such that, in a state in which the particulate sensor 1 is attached to the sensor attachment portion 120 fixed to the exhaust pipe EP, the gas introduction opening 35*h* can be visually recognized from the outside of the surrounding portion 125 through the gas introduction window 125*h* as shown in FIG. 16. Notably, FIG. 16 is a front view of the gas introduction window 125*h* as viewed from the downstream side of the exhaust pipe EP. In the present embodiment, the shape of the gas introduction window 125*h* is determined such that, as shown in FIG. 16, the entire gas introduction opening 35*h* can be visually recognized when the gas introduction opening 35*h* is viewed from the outside of the surrounding portion 125 through the gas introduction window 125*h* in the radial direction of the surrounding portion 125.

By virtue of the above-described configuration, the water spraying from the upstream side of the exhaust pipe EP toward the pipe interior disposition portion 5A of the particulate sensor 1 is received by a part of the surrounding portion 125 located on the upstream side of the exhaust pipe EP (on the right-hand side in FIG. 5), so that the water is less likely to enter the interior of the particulate sensor 1 (the sensor main body 5) through the gas introduction opening 35*h*. In addition, it becomes easier for the exhaust gas EG flowing through the exhaust pipe EP to be introduced into the gas introduction opening 35*h* through the gas introduction window 125*h*.

Figure 9:
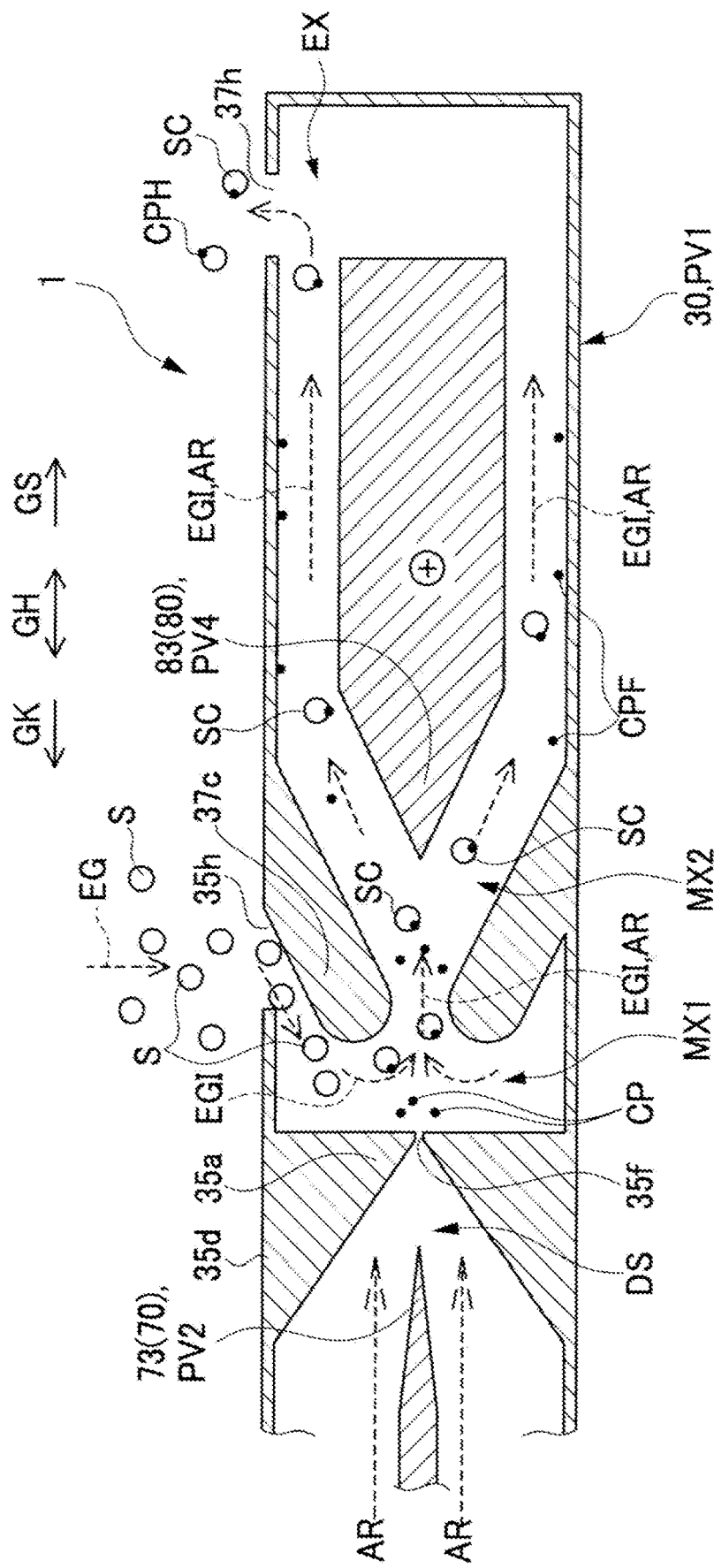
FIG. 9 is a view schematically showing the introduction, electrification and discharge of particulates in the particulate sensor.

Next, the electrical function and operation of the particulate sensor 1 will be described (see FIGS. 8 and 9). First, by activating the external circuit section 201, a gaseous discharge (corona discharge) is generated between the nozzle portion 35*a* (the discharge counter electrode portion 35*d*) of the inner metallic member 30 maintained at the reference potential PV1 and the needle-shaped forward end portion 73 of the discharge electrode member 70 maintained at the discharge potential PV2 which is a positive high potential with respect to the reference potential PV1. As a result of this gaseous discharge, positive ions CP are produced through ionization of $N_2$, $O_2$, etc., contained in the atmosphere (air). Meanwhile, the air AR introduced into the interior of the sensor main body 5 through the first air introduction portion 25 is supplied to the discharge space DS. Therefore, some of the produced ions CP are jetted from the discharge space DS into the cylindrical mixing region MX1 through the communication hole 35*f* (orifice hole) together with the air AR.

When the air AR is jetted into the cylindrical mixing region MX1, since the pressure within the cylindrical mixing region MX1 decreases, the exhaust gas EG flowing through the exhaust pipe EP is taken into the cylindrical mixing region MX1 through the gas introduction opening 35*h*. This intake gas EGI is mixed with the air AR and is discharged from the gas discharge opening 37*h* through the slit-shaped mixing region MX2 and the gas exhaust passage EX. At that time, the particulates S (soot or the like) contained in the exhaust gas EG are also taken into the cylindrical mixing region MX1. The particulates S become positively electrified particulates SC as a result of adhesion of the ions CP thereto. The electrified particulates SC are discharged from the gas discharge opening 37*h* together with the air AR. Floating ions CPF include ions CP jetted into the cylindrical mixing region MX1 and which have failed to adhere to the particulates S. The floating ions CPF are subjected to a repulsive force from the auxiliary electrode portion 83 of the auxiliary electrode member 80 maintained at the auxiliary potential PV4 and adhere to the trapping electrode 37*c*. As a result, discharge of the floating ions CPF from the gas discharge opening 37*h* is restrained.

At the time of the above-described gaseous discharge, discharge current Id is supplied from the external circuit section 201 to the needle-shaped forward end portion 73 of the discharge electrode member 70. Most of the discharge current Id flows into the nozzle portion 35*a* as a received current Ij and returns to the circuit section 201. Meanwhile, a trapped current Ih stemming from the charge of the floating ions CPF trapped by the trapping electrode 37*c* also returns to the circuit section 201. Namely, received-trapped current Ijh which is the sum of the received current Ij and the trapped current Ih (Ijh=Ij+Ih) returns to the circuit section 201.

However, the received-trapped current Ijh is smaller in magnitude than the discharge current Id by an amount corresponding to the charge of discharged ions CPH (ions having adhered to the electrified particulates SC and being discharged). Therefore, a current signal corresponding to the difference between the discharge current Id and the received-trapped current Ijh (the discharge current Id—the received-trapped current Ijh) flows between the reference potential PV1 and the ground potential PVE.

Accordingly, the amount of the particulates S in the exhaust gas EG can be detected by detecting, through use of the circuit section 201, the signal current corresponding to the amount of charge of the discharged ions CPH; i.e., the ions discharged by the electrified particulates SC. Therefore, in the present embodiment, the amount of the particulates S in the exhaust gas EG (gas under measurement) is detected based on the amount of charge of the electrified particulates SC (specifically, based on the signal current flowing between the reference potential PV1 and the ground potential PVE in accordance with the amount of charge of the electrified particulates SC).

Notably, as the "amount of the particulates S" detected by the particulate sensor 1, a value proportional to the sum total of the surface areas of the particulates S in the exhaust gas EG may be obtained, or a value proportional to the sum total of the masses of the particulates S may be obtained. Alternatively, a value proportional to the number of the particulates S contained in a unit volume of the exhaust gas EG may be obtained.

(Modification)

Next, a modification of the embodiment will be described which is the same as the embodiment except for the form of the sensor-side positioning portion of the particulate sensor and the form of the pipe-side positioning portion of the sensor attachment portion. Accordingly, the configurational features of the modification which differ from that of the embodiment will be mainly described, and descriptions of the configurational features of the modification identical to those of the embodiment will be omitted or simplified.

Figure 20:
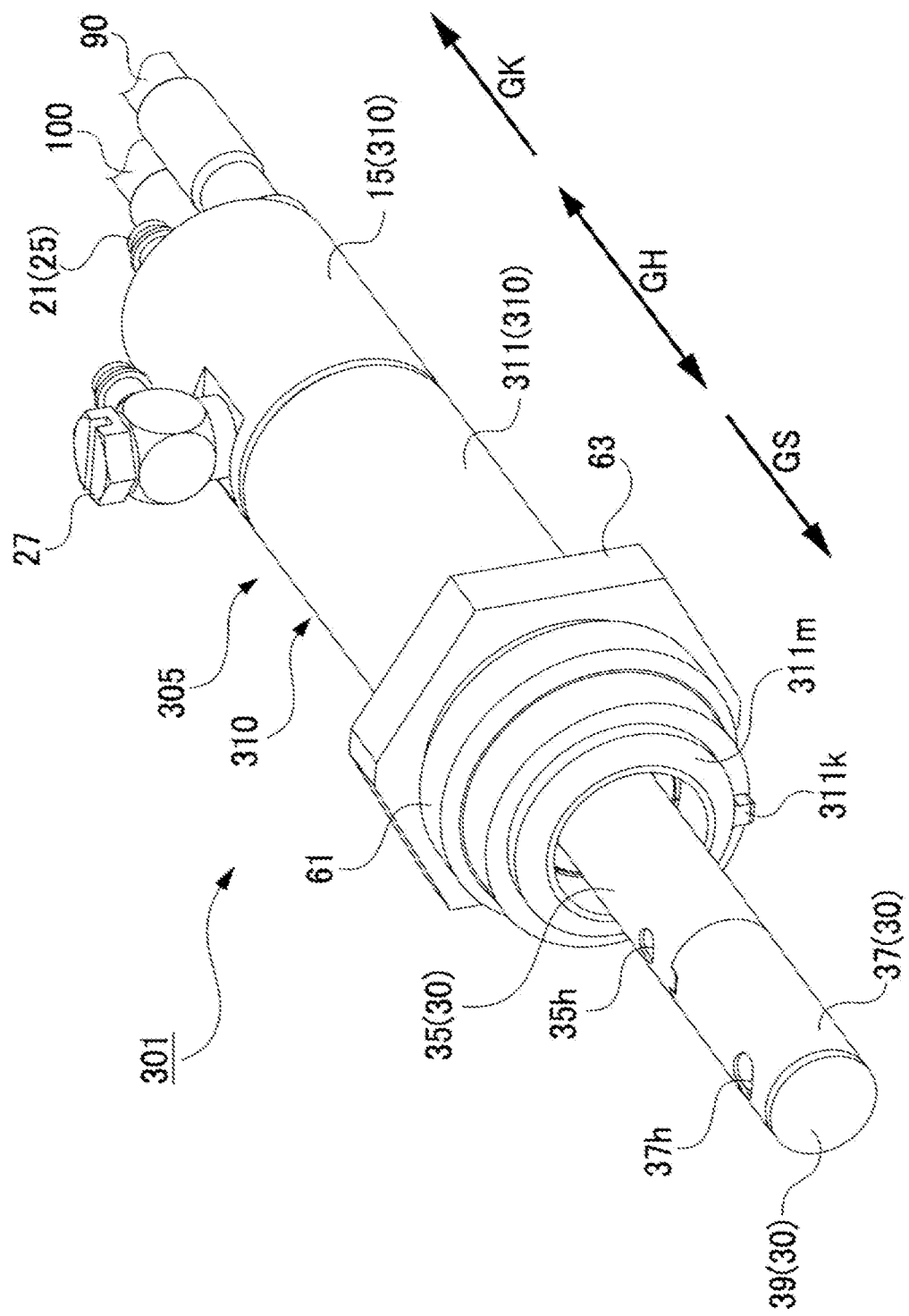
FIG. 20 is a perspective view of a particulate sensor according to a modification.
Figure 21:
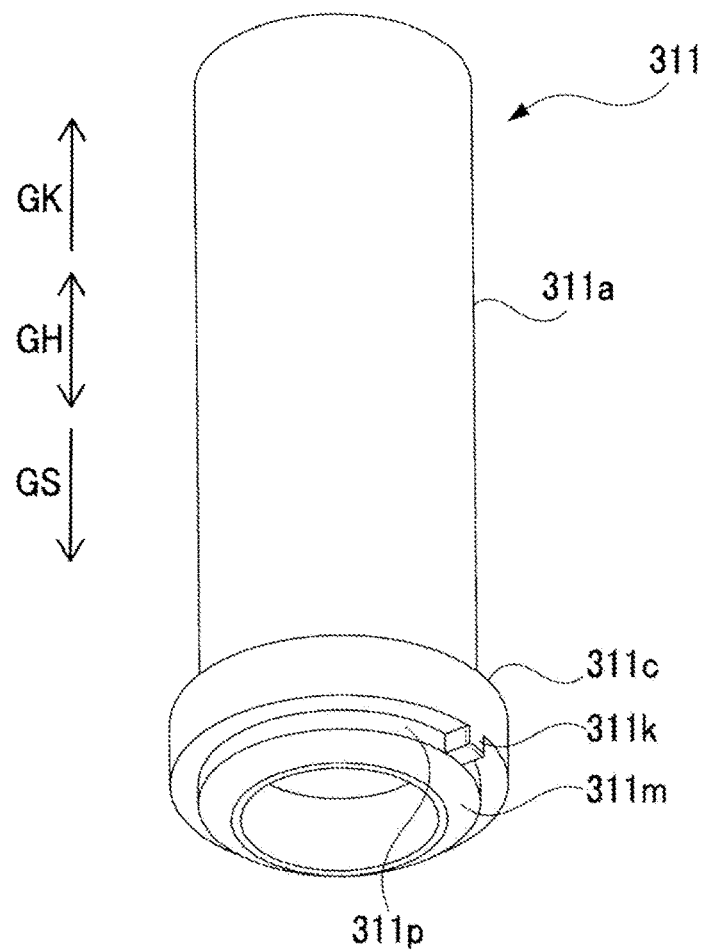
FIG. 21 is a perspective view of a first outer metallic member according to the modification.
Figure 22:
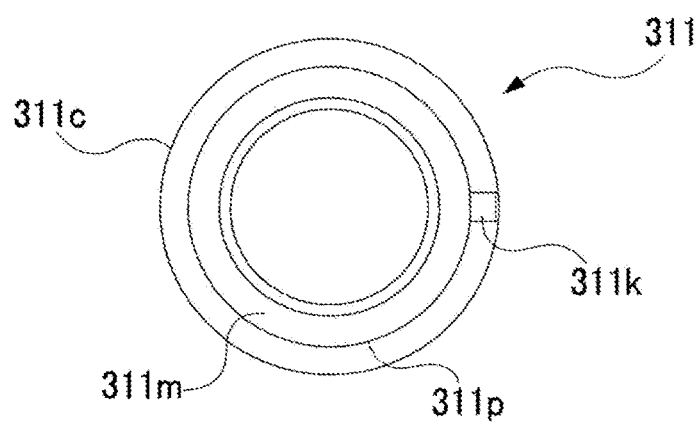
FIG. 22 is a bottom view (plane view of a forward end portion) of the first outer metallic member.
Figure 23:
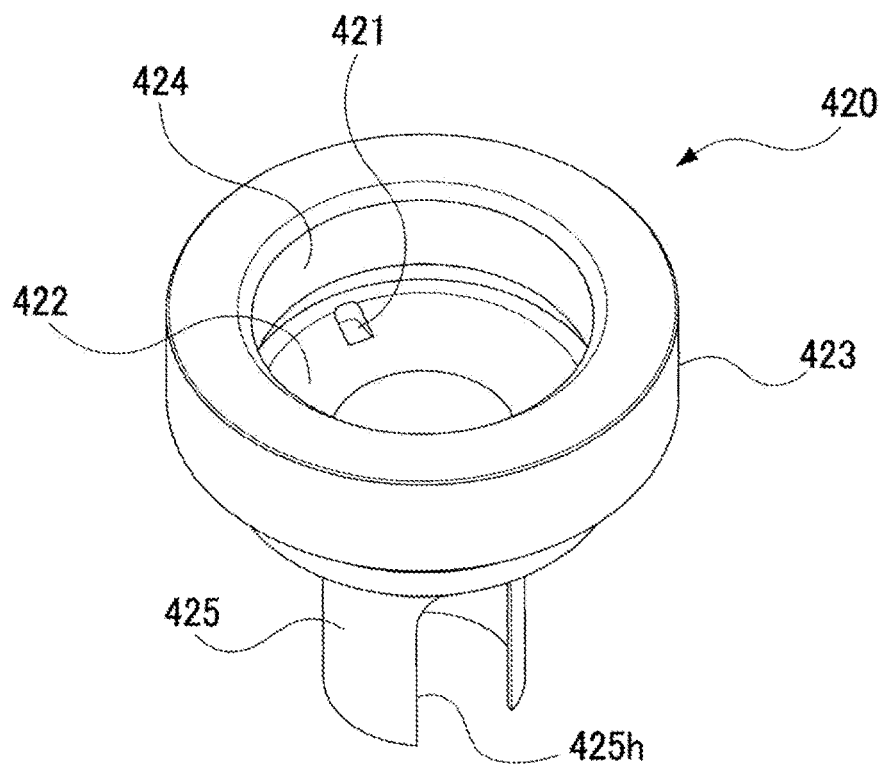
FIG. 23 is a perspective view of a sensor attachment portion according to the modification.
Figure 24:
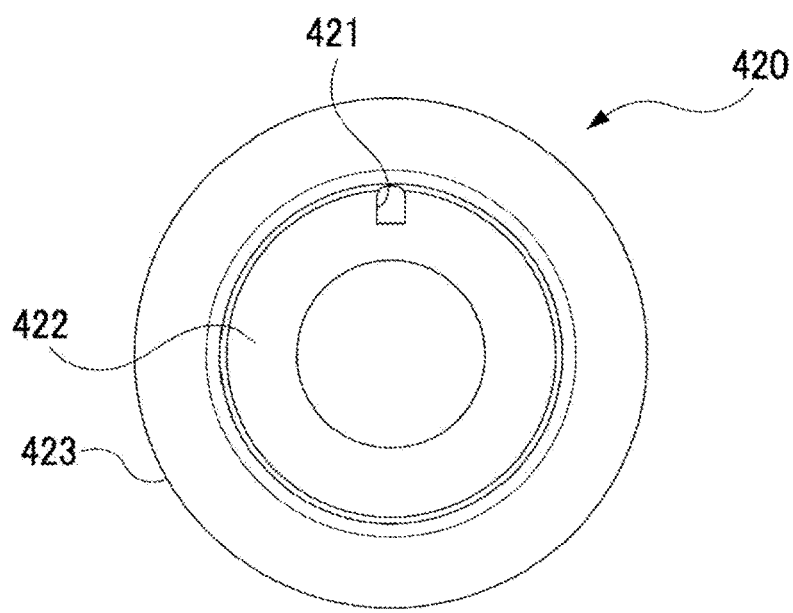
FIG. 24 is a top view (plane view of a rear end portion) of the sensor attachment portion.
Figure 25:
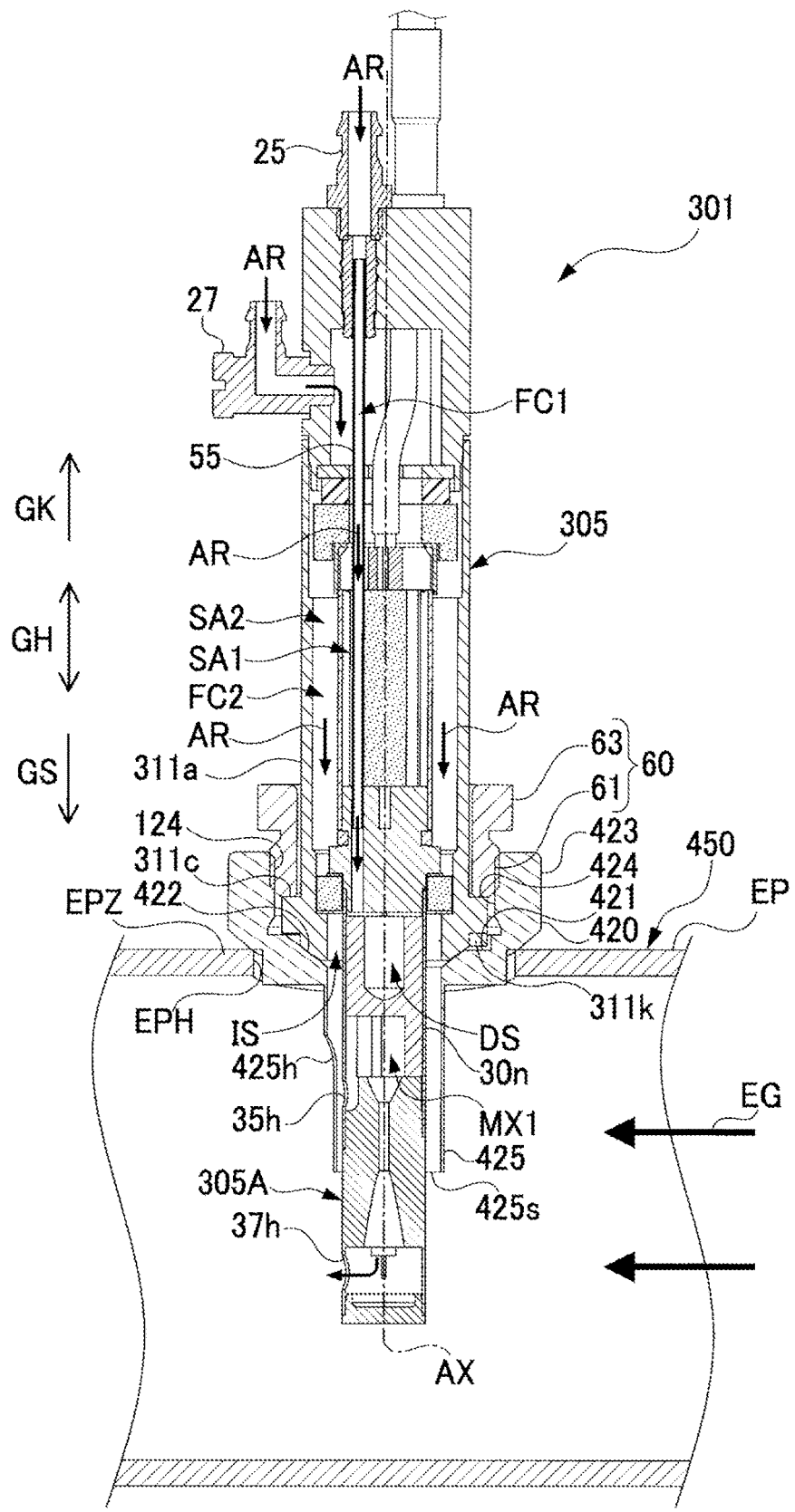
FIG. 25 is a longitudinal sectional view showing a state in which the particulate sensor according to the modification is attached to the exhaust pipe.
Figure 26:
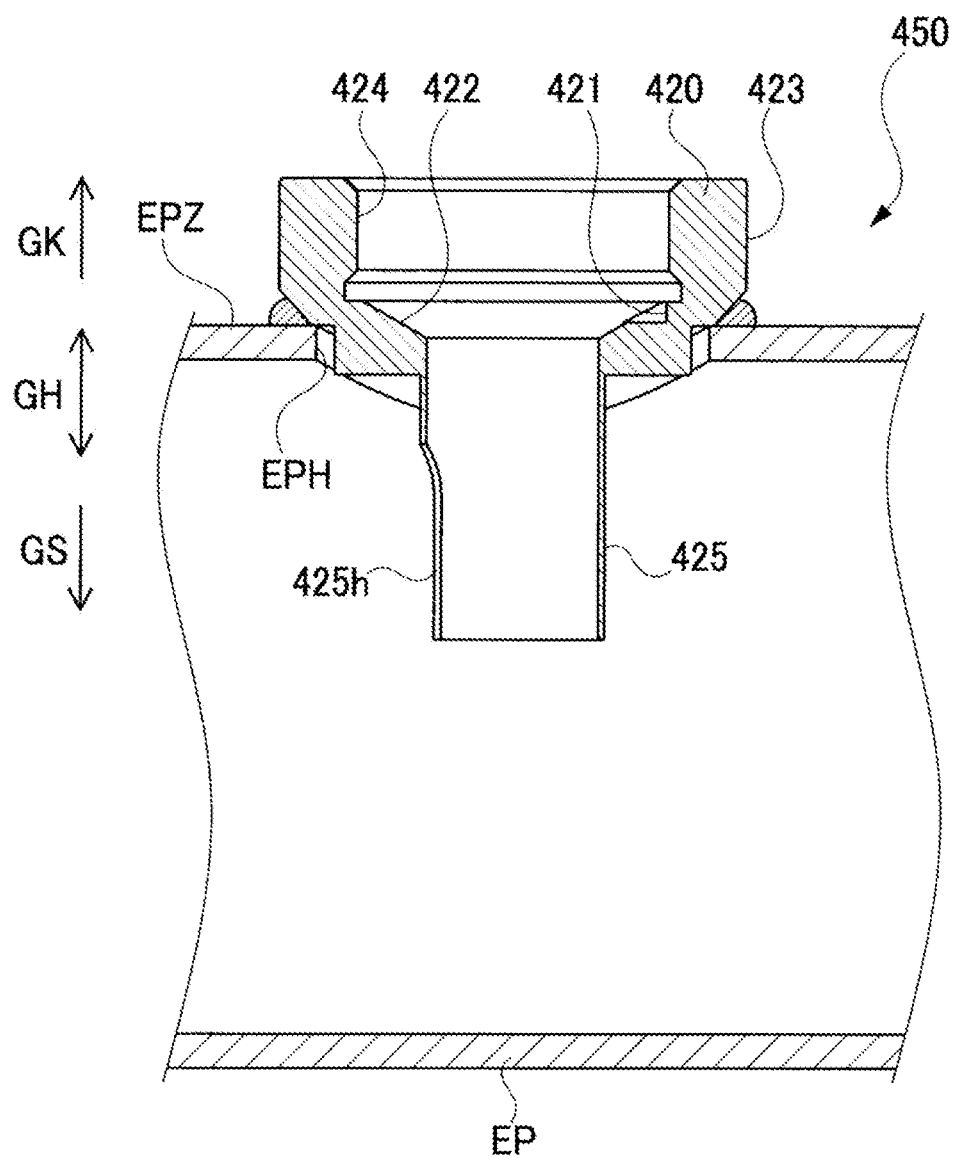
FIG. 26 is an enlarged sectional view of an attachment portion equipped gas flow pipe according to the modification.

FIG. 20 is a perspective view of a particulate sensor 301 according to the modification. FIG. 21 is a perspective view of a first outer metallic member 311 according to the modification. FIG. 22 is a bottom view (plane view as viewed from the forward end side GS) of the first outer metallic member 311. FIG. 23 is a perspective view of a sensor attachment portion 420 according to the modification. FIG. 24 is a top view (plane view from the rear end side GK) of the sensor attachment portion 420. FIG. 25 is a longitudinal sectional view showing a state in which the particulate sensor 301 according to the modification is attached to an attachment portion equipped gas flow pipe 450 (the sensor attachment portion 420 fixed to the exhaust pipe EP). FIG. 26 is a sectional view of the attachment portion equipped gas flow pipe 450 according to the modification.

As shown in FIGS. 20 to 22, the first outer metallic member 311 which constitutes a portion of the outer metallic member 310 of the present modification includes a cylindrical first main body 311a, an annular flange portion 311c located on the forward end side GS of the first main body 311a and bulging radially outward, a forward end annular portion 311p located on the forward end side GS of the flange portion 311c and having a seal portion 311m, and a sensor-side positioning portion 311k which protrudes radially outward from a portion of the outer circumferential surface of the forward end annular portion 311p.

As described above, unlike the first outer metallic member 11 of the embodiment, the first outer metallic member 311 of the present modification has, as a sensor-side positioning portion, the sensor-side positioning portion 311k in the form of a protrusion which protrudes radially outward from a portion of the outer circumferential surface of the forward end annular portion 311p (in other words, in the form of a protrusion which protrudes toward the forward end side from a circumferential region of an annular forward end surface of the flange portion 311c) (see FIGS. 21 and 22). The shape of such a sensor-side positioning portion 311k is not rotationally symmetric about the center axis of the first outer metallic member 311 (about the axial line AX of the particulate sensor 301). Namely, when the sensor-side positioning portion 311k is rotated one turn (rotated 360°) about the center axis of the first outer metallic member 311 (about the axial line AX of the particulate sensor 301), in the middle of the rotation, the sensor-side positioning portion 311k does not have the same circumferential position as the original circumferential position of the sensor-side positioning portion 311k before being rotated.

Also, as shown in FIGS. 23 to 26, the sensor attachment portion 420 of the present modification has a cylindrical attachment main body 423 and a cylindrical surrounding portion 425 located on the forward end side GS of the attachment main body 423. Notably, the surrounding portion 425 has a gas introduction window 425h which is a cutout having a U-like shape in plane view. An internal thread 424 is formed on a portion of an inner circumferential surface of the attachment main body 423, which portion is located on the rear end side GK. Further, a seating surface portion 422 tapered such that its diameter decreases toward the forward end side GS is formed on a portion of the inner circumferential surface of the attachment main body 423, which portion is located on the forward end side GS. Further, a pipe-side positioning portion 421 is formed on the inner circumferential surface of the attachment main body 423 to be located on the rear end side GK of the seating surface portion 422. The pipe-side positioning portion 421 is recessed toward the forward end side GS with respect to the remaining circumferential portion (is formed by recessing a portion, in the circumferential direction, of the inner circumferential surface toward the forward end side GS). The pipe-side positioning portion 421 has a shape matching the sensor-side positioning portion 311k (a shape allowing the sensor-side positioning portion 311k to be mated with the pipe-side positioning portion 421).

Accordingly, in the present modification as well, like the embodiment, there is only one method of combining (mating) the sensor-side positioning portion 311k with the pipe-side positioning portion 421; i.e., there is only one circumferential position (about the axial line AX of the particulate sensor 301) of the sensor-side positioning portion 311k at which the sensor-side positioning portion 311k can be combined (mated) with the pipe-side positioning portion 421. In other words, there is only one direction (position) (about the axial line AX of the particulate sensor 301) of the sensor-side positioning portion 311k at which the sensor-side positioning portion 311k can be combined (mated) with the pipe-side positioning portion 421 shown in FIG. 24.

Accordingly, when the particulate sensor 301 is attached to the sensor attachment portion 420, with the sensor-side positioning portion 311k being inserted (fitted) into (mated with) the pipe-side positioning portion 421 such that the sensor-side positioning portion 311k is mated with the pipe-side positioning portion 421, the circumferential position (position about the axial line AX) of the sensor main body 305 with respect to the sensor attachment portion 420 can always be set to a fixed circumferential position (the position shown in FIG. 25). As a result, the circumferential position of the gas introduction opening 35*h* within the exhaust pipe EP can always be set to the fixed first circumferential position (the position shown in FIG. 25 and at which the gas introduction opening 35*h* is open toward the downstream side of the exhaust pipe EP).

Namely, when the particulate sensor 301 is attached to the sensor attachment portion 420 of the attachment portion equipped gas flow pipe 450 while the circumferential position of the sensor main body 305 with respect to the sensor attachment portion 420 is determined by the sensor-side positioning portion 311*k*, the circumferential position of the gas introduction opening 35*h* within the exhaust pipe EP can always be set to the fixed first circumferential position (see FIG. 25). In other words, when the particulate sensor 301 is attached to the sensor attachment portion 420 of the attachment portion equipped gas flow pipe 450 while the circumferential position of the sensor main body 305 with respect to the sensor attachment portion 420 is determined by the pipe-side positioning portion 421, the circumferential position of the gas introduction opening 35*h* within the exhaust pipe EP can always be set to the fixed first circumferential position (see FIG. 25).

As described above, in the modification as well, in the case where the particulate sensor 301 is detached from the sensor attachment portion 420 and is again attached to the sensor attachment portion 420, the circumferential position of the gas introduction opening 35*h* within the exhaust pipe EP (gas flow pipe) can always be set to the fixed first circumferential position.

The present invention has been described based on the above embodiment and modification. However, the present invention is not limited to the above-described embodiment and modification, and may be freely modified without departing from the scope of the present invention.

Figure 27:
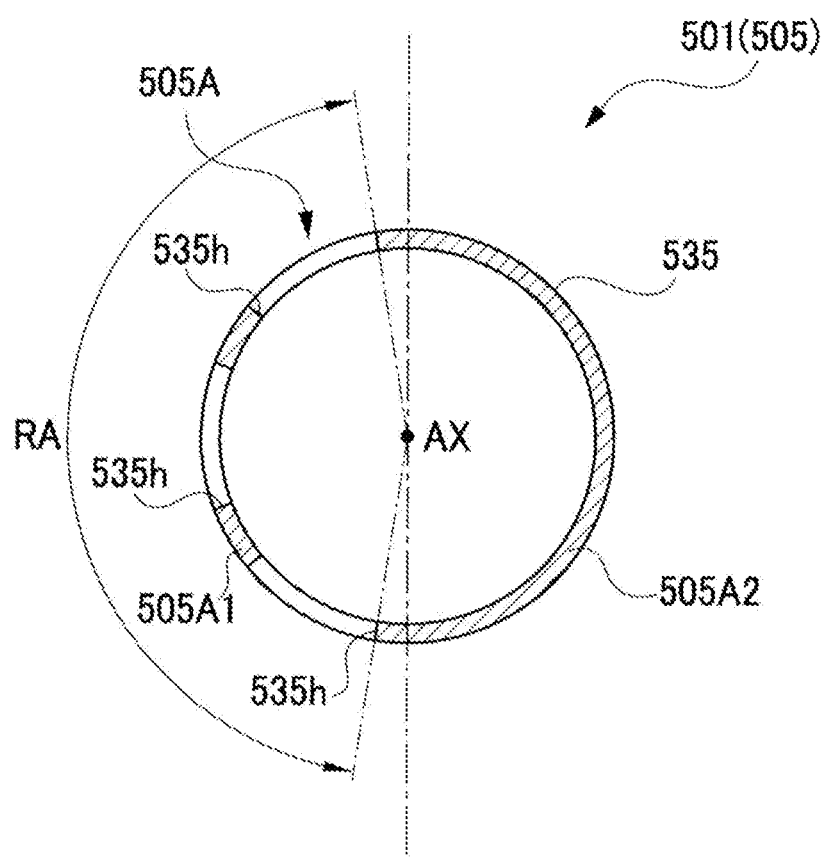
FIG. 27 is a view for describing a gas introduction opening according to another embodiment.

For example, in the embodiment, etc., the particulate sensors 1 and 301 each having a single gas introduction opening 35*h* are exemplified as the particulate sensor of the present invention. However, the present invention can be applied to a particulate sensor having a plurality of gas introduction openings. Specifically, for example, a particulate sensor 501 shown in FIG. 27 has three gas introduction openings 535*h* penetrating a wall portion of a pipe interior disposition portion 505A (nozzle member 535). FIG. 27 is a cross sectional view of the nozzle member 535 contained in the pipe interior disposition portion 505A of the particulate sensor 501, the cross sectional view being a sectional view of the nozzle member 535 taken along line L-L of FIG. 5.

As shown in FIG. 27, as in the case of the embodiment, etc., the three gas introduction openings 535*h* are formed in the pipe interior disposition portion 505A such that, when the outer circumferential surface of the pipe interior disposition portion 505A is viewed in the circumferential direction (viewed about the axial line AX), a circumferential range RA of the pipe interior disposition portion 505A in which all the three gas introduction openings 535*h* are contained is equal to or less than half of the entire circumference of the pipe interior disposition portion 505A. In other words, the three gas introduction openings 535*h* are formed in the pipe interior disposition portion 505A such that, when the pipe interior disposition portion 505A is cut along the axis of the pipe interior disposition portion (which coincides with the axial line AX), into two portions; i.e., a portion 505A1 on one side (a left half in FIG. 27) and a portion 505A2 on the other side (a right half in FIG. 27), all the gas introduction openings 535*h* are located in the portion 505A1 on the one side.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2018-054257 filed Mar. 22, 2018, the disclosure of which is incorporated herein by reference in its entirety.

What is claimed is:

1. An attachment structure of a particulate sensor for attaching the particulate sensor to a sensor attachment portion fixed to a gas flow pipe, the particulate sensor detecting the amount of particulates contained in a gas under measurement flowing through the gas flow pipe, wherein the particulate sensor includes a tubular sensor main body extending in an axial direction and which can be attached to and detached from the sensor attachment portion, wherein the sensor main body has a pipe interior disposition portion which is a portion of the sensor main body located on a forward end side in the axial direction and has the shape of a tube extending in the axial direction and which is disposed in the gas flow pipe when the particulate sensor is attached to the sensor attachment portion, wherein the pipe interior disposition portion has one or more gas introduction openings which penetrate a wall portion of the pipe interior disposition portion and through which the gas under measurement is introduced into the sensor main body, wherein the one or more gas introduction openings are formed in the pipe interior disposition portion such that, when an outer circumferential surface of the pipe interior disposition portion is viewed in a circumferential direction, a circumferential region of the pipe interior disposition portion which includes all the one or more gas introduction openings extends halfway or less in the circumferential direction of the pipe interior disposition portion, wherein the particulate sensor has a sensor-side positioning portion which determines the circumferential position of the sensor main body with respect to the sensor attachment portion when the particulate sensor is attached to the sensor attachment portion, wherein the sensor attachment portion has a pipe-side positioning portion which conforms to the sensor-side positioning portion and is configured such that, when the particulate sensor is attached to the sensor attachment portion with the sensor-side positioning portion and the pipe-side positioning portion being mated with each other, the circumferential position of the sensor main body with respect to the sensor attachment portion is always set to a fixed circumferential position, whereby, when the particulate sensor is attached to the sensor attachment portion with the sensor-side positioning portion and the pipe-side positioning portion being mated with each other, the circumferential position of each of the one or more gas introduction openings within the gas flow pipe is always set to a fixed first circumferential position, wherein the gas flow pipe has a hole-defining portion which defines a through hole penetrating a wall portion of the gas flow pipe and to which the sensor attachment portion is attached, wherein the sensor attachment portion has a surrounding portion which has the shape of a tube extending in the axial direction and is disposed in the gas flow pipe, the surrounding portion surrounding a circumference of the pipe interior disposition portion of the sensor main body in a state in which the particulate sensor is attached to the sensor attachment portion fixed to the gas flow pipe, wherein, in the state in which the particulate sensor is attached to the sensor attachment portion fixed to the gas flow pipe, a surrounding forward end portion which is a part of the surrounding portion located furthest to the forward end side in the axial direction is located on the forward end side, in the axial direction, of the gas introduction opening of the pipe interior disposition portion, wherein the sensor attachment portion having the surrounding portion is at ground potential as a result of the sensor attachment portion being fixed to the gas flow pipe maintained at ground potential, and wherein the pipe interior disposition portion of the sensor main body is electrically insulated from the sensor attachment portion and maintained at a reference potential different from the ground potential.

2. The attachment structure of a particulate sensor as claimed in claim 1, wherein the one or more gas introduction openings positioned at the first circumferential position as a result of attachment of the particulate sensor to the sensor attachment portion are open toward a downstream side of the gas flow pipe, and wherein the surrounding portion has a gas introduction window which is open toward the downstream side of the gas flow pipe and through which the one or more gas introduction openings can be visually recognized from the outside of the surrounding portion in a state in which the particulate sensor is attached to the sensor attachment portion fixed to the gas flow pipe.

3. A particulate sensor which is attached to a sensor attachment portion fixed to a gas flow pipe and adapted to detect the amount of particulates contained in a gas under measurement flowing through the gas flow pipe, wherein the particulate sensor includes a tubular sensor main body extending in an axial direction and which can be attached to and detached from the sensor attachment portion, wherein the sensor main body has a pipe interior disposition portion which is a portion of the sensor main body located on a forward end side in the axial direction and has the shape of a tube extending in the axial direction and which is disposed in the gas flow pipe when the particulate sensor is attached to the sensor attachment portion, wherein the pipe interior disposition portion has one or more gas introduction openings which penetrate a wall portion of the pipe interior disposition portion and through which the gas under measurement is introduced into the sensor main body, wherein the one or more gas introduction openings are formed in the pipe interior disposition portion such that, when an outer circumferential surface of the pipe interior disposition portion is viewed in a circumferential direction, a circumferential region of the pipe interior disposition portion which includes all of the one or more gas introduction openings extends halfway or less in the circumferential direction of the pipe interior disposition portion, wherein the particulate sensor has a sensor-side positioning portion which always sets the circumferential position of the sensor main body with respect to the sensor attachment portion to a fixed circumferential position when the particulate sensor is attached to the sensor attachment portion, whereby, when the particulate sensor is attached to the sensor attachment portion with the circumferential position of the sensor main body with respect to the sensor attachment portion being determined by the sensor-side positioning portion, the circumferential position of each of the one or more gas introduction openings within the gas flow pipe is always set to a fixed first circumferential position, wherein the gas flow pipe has a hole-defining portion which defines a through hole penetrating a wall portion of the gas flow pipe and to which the sensor attachment portion is attached, wherein the sensor attachment portion has a surrounding portion which has the shape of a tube extending in the axial direction and is disposed in the gas flow pipe, the surrounding portion surrounding a circumference of the pipe interior disposition portion of the sensor main body in a state in which the particulate sensor is attached to the sensor attachment portion fixed to the gas flow pipe, wherein, in the state in which the particulate sensor is attached to the sensor attachment portion fixed to the gas flow pipe, a surrounding forward end portion which is a part of the surrounding portion located furthest to the forward end side in the axial direction is located on the forward end side, in the axial direction, of the gas introduction opening of the pipe interior disposition portion, wherein the sensor attachment portion having the surrounding portion is at ground potential as a result of the sensor attachment portion being fixed to the gas flow pipe maintained at ground potential, and wherein the pipe interior disposition portion of the sensor main body is electrically insulated from the sensor attachment portion and maintained at a reference potential different from the ground potential.

4. An attachment portion equipped gas flow pipe comprising a gas flow pipe and a sensor attachment portion which is fixed to the gas flow pipe and to which a particulate sensor is attached for detecting the amount of particulates contained in a gas under measurement flowing through the gas flow pipe, wherein the particulate sensor includes a tubular sensor main body extending in an axial direction and which can be attached to and detached from the sensor attachment portion, wherein the sensor main body has a pipe interior disposition portion which is a portion of the sensor main body located on a forward end side in the axial direction and has the shape of a tube extending in the axial direction and which is disposed in the gas flow pipe when the particulate sensor is attached to the sensor attachment portion, wherein the pipe interior disposition portion has one or more gas introduction openings which penetrate a wall portion of the pipe interior disposition portion and through which the gas under measurement is introduced into the sensor main body, wherein the one or more gas introduction openings are formed in the pipe interior disposition portion such that, when an outer circumferential surface of the pipe interior disposition portion is viewed in a circumferential direction, a circumferential region of the pipe interior disposition portion which includes all the one or more gas introduction openings extends halfway or less in the circumferential direction of the pipe interior disposition portion, wherein the sensor attachment portion has a pipe-side positioning portion which always sets the circumferential position of the sensor main body with respect to the sensor attachment portion to a fixed circumferential position when the particulate sensor is attached to the sensor attachment portion, whereby, when the particulate sensor is attached to the sensor attachment portion with the circumferential position of the sensor main body with respect to the sensor attachment portion being determined by the pipe-side positioning portion, the circumferential position of each of the one or more gas introduction openings within the gas flow pipe is always set to a fixed first circumferential position, wherein the gas flow pipe has a hole-defining portion which defines a through hole penetrating a wall portion of the gas flow pipe and to which the sensor attachment portion is attached, wherein the sensor attachment portion has a surrounding portion which has the shape of a tube extending in the axial direction and is disposed in the gas flow pipe, the surrounding portion surrounding a circumference of the pipe interior disposition portion of the sensor main body in a state in which the particulate sensor is attached to the sensor attachment portion fixed to the gas flow pipe, wherein, in the state in which the particulate sensor is attached to the sensor attachment portion fixed to the gas flow pipe, a surrounding forward end portion which is a part of the surrounding portion located furthest to the forward end side in the axial direction is located on the forward end side, in the axial direction, of the gas introduction opening of the pipe interior disposition portion, wherein the sensor attachment portion having the surrounding portion is at ground potential as a result of the sensor attachment portion being fixed to the gas flow pipe maintained at ground potential, and wherein the pipe interior disposition portion of the sensor main body is electrically insulated from the sensor attachment portion and maintained at a reference potential different from the ground potential.

5. The attachment portion equipped gas flow pipe as claimed in claim 4, wherein, when the particulate sensor is attached to the sensor attachment portion with the circumferential position of the sensor main body with respect to the sensor attachment portion being determined by the pipe-side positioning portion, the pipe-side positioning portion determines the circumferential position of the sensor main body such that the one or more gas introduction openings positioned at the first circumferential position are open toward a downstream side of the gas flow pipe, and wherein the surrounding portion has a gas introduction window which is open toward the downstream side of the gas flow pipe and through which the one or more gas introduction openings can be visually recognized from the outside of the surrounding portion in a state in which the particulate sensor is attached to the sensor attachment portion.

6. A sensor attachment portion which is fixed to a gas flow pipe and to which a particulate sensor is attached for detecting the amount of particulates contained in a gas under measurement flowing through the gas flow pipe, wherein the particulate sensor includes a tubular sensor main body extending in an axial direction and which can be attached to and detached from the sensor attachment portion, wherein the sensor main body has a pipe interior disposition portion which is a portion of the sensor main body located on a forward end side in the axial direction and has the shape of a tube extending in the axial direction and which is disposed in the gas flow pipe when the particulate sensor is attached to the sensor attachment portion, wherein the pipe interior disposition portion has one or more gas introduction openings which penetrate a wall portion of the pipe interior disposition portion and through which the gas under measurement is introduced into the sensor main body, wherein the one or more gas introduction openings are formed in the pipe interior disposition portion such that, when an outer circumferential surface of the pipe interior disposition portion is viewed in a circumferential direction, a circumferential region of the pipe interior disposition portion which includes all the one or more gas introduction openings extends halfway or less in the circumferential direction of the pipe interior disposition portion, and wherein the sensor attachment portion has a pipe-side positioning portion which always sets the circumferential position of the sensor main body with respect to the sensor attachment portion to a fixed circumferential position when the particulate sensor is attached to the sensor attachment portion fixed to the gas flow pipe, whereby, when the particulate sensor is attached to the sensor attachment portion fixed to the gas flow pipe with the circumferential position of the sensor main body with respect to the sensor attachment portion being determined by the pipe-side positioning portion, the circumferential position of each of the one or more gas introduction openings within the gas flow pipe is always set to a fixed first circumferential position, wherein the gas flow pipe has a hole-defining portion which defines a through hole penetrating a wall portion of the gas flow pipe and to which the sensor attachment portion is attached, wherein the sensor attachment portion has a surrounding portion which has the shape of a tube extending in the axial direction and is disposed in the gas flow pipe, the surrounding portion surrounding a circumference of the pipe interior disposition portion of the sensor main body in a state in which the particulate sensor is attached to the sensor attachment portion fixed to the gas flow pipe, wherein, in the state in which the particulate sensor is attached to the sensor attachment portion fixed to the gas flow pipe, a surrounding forward end portion which is a part of the surrounding portion located furthest to the forward end side in the axial direction is located on the forward end side, in the axial direction, of the gas introduction opening of the pipe interior disposition portion, wherein the sensor attachment portion having the surrounding portion is at ground potential as a result of the sensor attachment portion being fixed to the gas flow pipe maintained at ground potential, and wherein the pipe interior disposition portion of the sensor main body is electrically insulated from the sensor attachment portion and maintained at a reference potential different from the ground potential.

* * * * *